United States Patent
Pinheiro et al.

(10) Patent No.: US 10,420,017 B2
(45) Date of Patent: *Sep. 17, 2019

(54) PROVISIONING OF APPLICATION CATEGORIES AT A USER EQUIPMENT DURING NETWORK CONGESTION

(71) Applicant: INTEL IP CORPORATION, Santa Clara, CA (US)

(72) Inventors: Ana Lucia A. Pinheiro, Breinigsville, PA (US); Marta Martinez Tarradell, Hillsboro, OR (US); Eric Siow, Beaverton, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/644,327

(22) Filed: Jul. 7, 2017

(65) Prior Publication Data

US 2017/0311229 A1  Oct. 26, 2017

Related U.S. Application Data

(63) Continuation of application No. 14/590,772, filed on Jan. 6, 2015, now Pat. No. 9,743,341, and a
(Continued)

(51) Int. Cl.
*H04W 48/06* (2009.01)
*H04W 28/02* (2009.01)
(Continued)

(52) U.S. Cl.
CPC ......... *H04W 48/06* (2013.01); *H04L 47/2475* (2013.01); *H04L 47/28* (2013.01);
(Continued)

(58) Field of Classification Search
CPC ......... H04W 28/0284; H04W 28/0226; H04W 48/06; H04W 28/02; H04L 47/2475;
(Continued)

(56) References Cited

U.S. PATENT DOCUMENTS 7,734,290 B2  6/2010  Juneja et al.
8,442,507 B2  5/2013  Duggal et al.
(Continued)

FOREIGN PATENT DOCUMENTS

CN   102859895 A   1/2013
JP   H10136423 A   5/1998
(Continued)

OTHER PUBLICATIONS

NTT DOCOMO et al.; "Requirements applied to heavy congestion scenarios of ACDC"; Change Request 22.011 CR 0193; 3GPP TSG S1-131143; (Jan. 31, 2013); 2 pages; SA WG1 Meeting #61, Prague, Czech Republic; V11.2.0, Rev 2.
(Continued)

*Primary Examiner* — Man U Phan
(74) *Attorney, Agent, or Firm* — Thorpe North & Western

(57) ABSTRACT

Technology for a network element configured to apply Application Specific Congestion Control for Data Communication (ACDC) in a wireless network is disclosed. The network element can determine to apply ACDC in the wireless network to mitigate overload of the wireless network. The network element can process barring information for one or more ACDC categories for transmission to a user equipment (UE) when ACDC is applied in the wireless network. The barring information can indicate that the UE is prevented from accessing the network for applications associated with the one or more ACDC categories when ACDC is applied in the wireless network.

23 Claims, 17 Drawing Sheets

Related U.S. Application Data continuation-in-part of application No. PCT/US2014/031464, filed on Mar. 21, 2014.

(60) Provisional application No. 61/924,194, filed on Jan. 6, 2014, provisional application No. 61/806,821, filed on Mar. 29, 2013.

(51) Int. Cl.
  *H04L 12/859* (2013.01)
  *H04L 12/841* (2013.01)
  *H04L 29/08* (2006.01)
  *H04L 29/14* (2006.01)

(52) U.S. Cl.
  CPC ............ *H04L 67/22* (2013.01); *H04L 69/40* (2013.01); *H04W 28/02* (2013.01); *H04W 28/0226* (2013.01); *H04W 28/0284* (2013.01); *Y02D 70/126* (2018.01); *Y02D 70/14* (2018.01)

(58) Field of Classification Search
  CPC ......... H04L 47/28; H04L 67/22; H04L 69/40; H04L 29/14; H04L 12/859; H04L 29/08; H04L 12/841; Y02D 70/126; Y02D 70/14
  USPC ....................................................... 370/235
  See application file for complete search history.

(56) References Cited

U.S. PATENT DOCUMENTS

| | | | | |
|---|---|---|---|---|
| 8,577,329 | B2* | 11/2013 | Momtahan | H04L 12/14 379/114.03 |
| 8,626,113 | B2* | 1/2014 | Banjo | G06Q 20/1085 455/405 |
| 8,855,618 | B2* | 10/2014 | Hwang | H04W 52/0264 455/418 |
| 8,897,266 | B2 | 11/2014 | Gheorghiu et al. | |
| 8,972,967 | B2* | 3/2015 | Sannidhanam | G06F 8/60 717/170 |
| 9,226,222 | B2* | 12/2015 | Zhou | H04W 4/08 |
| 9,294,213 | B2* | 3/2016 | Gupta | H04W 4/90 |
| 9,332,571 | B2 | 5/2016 | Zhu et al. | |
| 9,392,531 | B2* | 7/2016 | Pinheiro | H04W 48/06 |
| 9,641,668 | B2* | 5/2017 | Aoyagi | H04M 1/72577 |
| 9,661,525 | B2* | 5/2017 | Rajadurai | H04W 28/0205 |
| 9,743,341 | B2* | 8/2017 | Pinheiro | H04W 28/0284 |
| 9,942,715 | B2* | 4/2018 | Racha | H04M 1/72577 |
| 10,004,027 | B2* | 6/2018 | Geng | H04W 48/02 |
| 10,212,578 | B2* | 2/2019 | Siow | H04W 28/0226 |
| 2006/0094423 | A1 | 5/2006 | Sharma et al. | |
| 2009/0018849 | A1 | 1/2009 | Feder et al. | |
| 2010/0246518 | A1 | 9/2010 | Gheorghiu et al. | |
| 2011/0275344 | A1 | 11/2011 | Momtahan et al. | |
| 2013/0045706 | A1 | 2/2013 | Hsu | |
| 2014/0010180 | A1 | 1/2014 | Lee et al. | |
| 2015/0223107 | A1* | 8/2015 | Zaus | H04L 47/2475 370/230 |
| 2016/0014632 | A1* | 1/2016 | Siow | H04L 5/0085 370/230 |
| 2017/0048747 | A1* | 2/2017 | Tiwari | H04W 76/10 |

FOREIGN PATENT DOCUMENTS

| | | |
|---|---|---|
| JP | 2001078260 A | 3/2001 |
| JP | 2011501897 A | 1/2011 |
| WO | WO 2010111476 A1 | 9/2010 |
| WO | WO 2014160611 A1 | 10/2014 |
| WO | WO 2014204144 A1 | 12/2014 |

OTHER PUBLICATIONS

3GPP TR 22.806; "3rd Generation Partnership Project; Technical Specification Group Services and System Aspects; Study on Application Specific Congestion Control for Data Communication"; (Nov. 2012); 7 pages; V0.2.0, Release 12.

Ray et al.; "An anonymous electronic voting protocol for voting over the Internet"; In: Proceedings on Advanced Issues of E-Commerce and Web-Based Information Systems (WECWIS 2001), 3$^{rd}$ International Work; (Dec. 2001); 18 pages; IEEE, San Juan, CA, USA; <doi: 10.1109/WECWIS.2001.933922 >.

Huawei Technologies Co. Ltd. et al.; "New Use Case on ACDC Activation for UE-Initiated Applications"; 3GPP TSG S1-124281; (Nov. 12-16, 2012); 2 pages; SA WG1 #60, Edinburgh, UK; (Agenda 9.5).

NTT DOCOMO et al.; "Requirements Applied to Heavy Congestion Scenarios of ACDC"; 3GPP TSG S1-131285; (Jan. 28-Feb. 1, 2013); 2 pages; SA WG1 Meeting #61, Prague, Czech Republic; 22.011 CR 0193 rev 4 Version 11.2.0.

European search report dated Apr. 23, 2018, in EP Application No. 18152277.2, filed Mar. 21, 2014; 4 pages.

\* cited by examiner

| Applications (or Application Categories) | Option 1 | Option 2 |
|---|---|---|
| A | N | N |
| B | N | N+1 |
| C | N+1 | N+2 |
| D | N+1 | N+3 |
| E | N+2 | N+4 |
| F | N+2 | N+5 |
| G | N+3 | N+6 |
| H | N+3 | N+7 |

FIG. 1A

| Applications (or Application Categories) | Priority Level | Allowed During Condition Level # |
|---|---|---|
| A | N | N, N+1, N+2, N+3 |
| B | N | N, N+1, N+2, N+3 |
| C | N+1 | N+1, N+2, N+3 |
| D | N+1 | N+1, N+2, N+3 |
| E | N+2 | N+2, N+3 |
| F | N+2 | N+2, N+3 |
| G | N+3 | N+3 |
| H | N+3 | N+3 |

FIG. 1B

| Category | Allowed During Condition Level # |
|---|---|
| Cat A | probability of access Cat A<br>time of barring Cat A |
| Cat B | probability of access Cat B<br>time of barring Cat B |
| Cat C | probability of access Cat C<br>time of barring Cat C |
| Cat D | probability of access Cat D<br>time of barring Cat D |
| Cat E | probability of access Cat E<br>time of barring Cat E |

FIG. 10

| Category | Applications | Country it applies | Allowed During Condition Level # |
|---|---|---|---|
| Cat A | App 1 | MCC1, MCC2, MCC3 | N, N+1, N+2, N+3, N+4 |
| | App 2 | MCC1 | |
| | App 3 | MCC3 | |
| Cat B | App 4 | MCC1, MCC2 | N+1, N+2, N+3, N+4 |
| | App 5 | MCC1 | |
| Cat C | App 2 | MCC2, MCC3 | N+2, N+3, N+4 |
| | App 3 | MCC1, MCC2 | |
| Cat D | App 4 | MCC3 | N+3, N+4 |
| Cat E | App 5 | MCC2, MCC3 | N+4 |

FIG. 11

| Category | Applications | Country it applies | Allowed During Condition Level |
|---|---|---|---|
| Cat A | App 1 | MCC1, MCC2, MCC3 | P1 |
| | App 2 | MCC1 | |
| | App 3 | MCC3 | |
| Cat B | App 4 | MCC1, MCC2 | P2 |
| | App 5 | MCC1 | |
| Cat C | App 2 | MCC2, MCC3 | P3 |
| | App 3 | MCC1, MCC2 | |
| Cat D | App 4 | MCC3 | P4 |
| Cat E | App 5 | MCC2, MCC3 | P5 |

FIG. 12

| Category | Condition Level | Country | Allowed during the following condition levels |
|---|---|---|---|
| Cat A | P1 | MCC1 | N, N+1, N+2, N+3, N+4 |
| | | MCC2 | N+1, N+2, N+3, N+4 |
| | | MCC3 | N+2, N+3, N+4 |
| Cat B | P2 | MCC1, MCC2, MCC3 | N+1, N+2, N+3, N+4 |
| Cat C | P3 | MCC1 | N+2, N+3, N+4 |
| | | MCC2, MCC3 | N+1, N+2, N+3, N+4 |
| Cat D | P4 | MCC1 | N+2, N+3, N+4 |
| | | MCC2 | N+1, N+2, N+3, N+4 |
| | | MCC3 | N+3, N+4 |
| Cat E | P5 | MCC1, MCC2, MCC3 | N+4 |

FIG. 13

PROVISIONING OF APPLICATION CATEGORIES AT A USER EQUIPMENT DURING NETWORK CONGESTION

RELATED APPLICATIONS

This application is a continuation of U.S. Pat. No. 9,743,341 filed Jan. 6, 2015, which claims the benefit of U.S. Provisional Patent Application No. 61/924,194, filed Jan. 6, 2014, and is a Continuation-in-Part of PCT Patent Application No. PCT/US14/31464, filed Mar. 21, 2014, which claims the benefit of U.S. Provisional Patent Application Ser. No. 61/806,821, filed Mar. 29, 2013, each of which are incorporated by reference in their entirety for all purposes.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIGS. 1A and 1B are tables illustrating a prioritization of Application Specific Congestion Control for Data Communications (ACDC)/Application and Service Access Control (ASAC) applications or application categories in accordance with an example;

FIG. 10 is a table illustrating a probability of access and a time of barring for a plurality of application categories in accordance with an example;

FIG. 11 is a table illustrating a prioritization of Application Specific Congestion Control for Data Communications (ACDC)/Application and Service Access Control (ASAC) application categories for various geographical locations with respect to a condition level in accordance with an example;

FIG. 12 is a table illustrating a prioritization of Application Specific Congestion Control for Data Communications (ACDC)/Application and Service Access Control (ASAC) application categories for various geographical locations with respect to a priority level in accordance with an example;

FIG. 13 is a table illustrating a plurality of priority levels with respect to geographical locations in accordance with an example;

Figure 2:
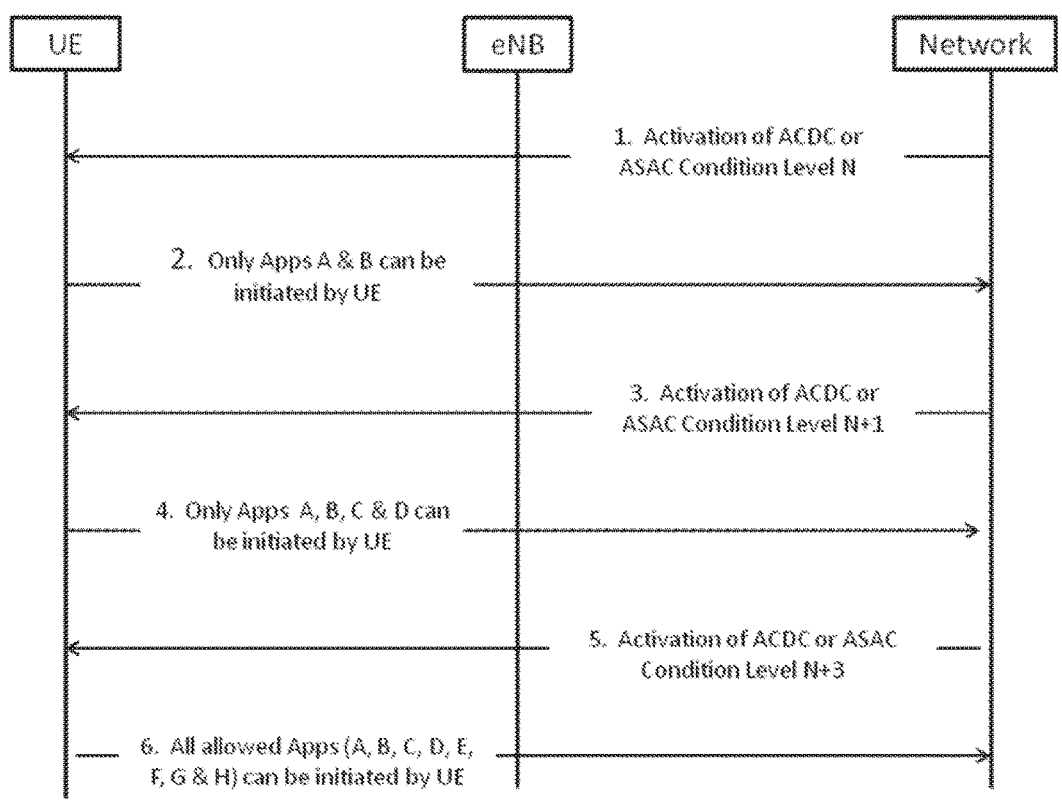
FIG. 2 illustrates an implementation of a prioritization scheme for applications or application categories between a network and a user equipment (UE) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, signaling protocol and exchanges, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The number of applications that are being downloaded, installed and operated on user equipments (UEs), such as mobile devices, tablet computers, laptop computers, etc., is continually growing at an increasing rate. These applications may include social networking applications, online shopping applications, news applications, educational applications, music applications, video streaming applications, and so on. Several standard developing organizations (SDOs), including 3GPP, have identified that the growing number of applications operating at the UEs are a major cause of network inefficiencies. These applications may (intentionally or unintentionally) cause congestion over a Radio Access Network (RAN) and Core Network (CN) owing to access for services.

During network congestion, particularly during emergency situations, it may be desirable to restrict certain applications or categories of applications (e.g., social networking applications, video streaming applications) to access the wireless network in order to protect and/or free up valuable wireless network resources. In other words, certain applications may be restricted when a wireless network or channel condition of the wireless network exceeds a capacity threshold. In addition, certain applications or categories of applications (e.g., emergency response applications) may be given priority when the wireless network is congested when these emergency situations occur. The certain applications or categories of applications may be restricted as long as the restriction complies with regional/national or countrywide net neutrality regulations. As an example, after a severe earthquake in a geographical region, packet-based communication applications that confirm the safety of citizens (e.g. Disaster Message Board service, Disaster Voice Messaging service) when a natural disaster or particularly newsworthy event occurs may be given priority over video streaming applications during the emergency situation.

There are also applications that cause other problems, e.g. applications that disclose privacy information without user consent, or applications that encourage illegal activities that are prohibited by the local regulations. It may be desirable to restrict these problematic applications from accessing the wireless network, as long as the restriction is in compliance with regional/national or countrywide net neutrality regulations.

In 3GPP, the study of Application Specific Congestion Control for Data Communications (ACDC) have yielded a subset of work called Application and Service Access control (ASAC). ACDC/ASAC is further described in 3GPP Technical Report (TR) 22.806 V1.0.0. Both ACDC and ASAC have approved "white list/lists" of allowed applications or application categories to be pre-configured or downloaded onto the UE. As used herein, the term "white list" generally refers to a list of applications or categories of applications that are allowed to operate at the user equipment (UE) when ACDC/ASAC is activated by the wireless network. The terms "application categories" or "categories of applications" may be used interchangeably and can indicate one or more applications that are grouped together. For example, social networking applications may be grouped into a first application category and the most popular applications among users of ages 18-35 may be grouped into a second application category. The "white list" may be dynamically configured or provisioned by the wireless network on an as-needed basis. Therefore, network congestion may be alleviated by temporarily preventing applications or categories of applications that are not listed on the "white list" to be initiated by the UE when ACDC or ASAC is activated by the network operators. ACDC/ASAC may be activated to relieve network congestion subject to regional/national or countrywide regulations.

The preconfigured white list of applications or application categories that are allowed to access the wireless network may contribute towards alleviation of the network congestion, but may not necessarily alleviate network congestion caused by competing approved applications on the preconfigured white list. In other words, the various approved applications on the preconfigured white list may still cause network congestion. However, as discussed in further detail below, network congestion caused by competing approved applications on the preconfigured white list may be alleviated.

The ACDC/ASAC functionality may be implemented across two end points—the UE and a network element. In one example, the network element may include an ACDC/ASAC server. The ACDC/ASAC server is a network entity that provisions the ACDC/ASAC white lists on the UE, as well as activates, deactivates, and manages the overall ASAC functionality from a mobile network operator (MNO) perspective. In one configuration, the ACDC/ASAC server may be a standalone network entity, and in this configuration, the ACDC/ASAC server may use Simple Object Access Protocol (SOAP)/Extensible Markup Language (XML) based transport to communicate with the UE. Alternatively, the ACDC/ASAC server may be collocated with other network entities. For example, the ACDC/ASAC server may be collocated with a mobility management entity (MME) and use non-access-stratum (NAS) transport to communicate with UE. In addition, the ACDC/ASAC server may be collocated with an Access Network Discovery and Selection Function (ANDSF) and use Open Mobile Alliance Device Management (OMA-DM) transport to communicate with UE.

Applications or categories of applications may be prioritized according to an approved list of applications or application categories when ACDC/ASAC is activated. In other words, categories of applications (e.g., emergency service applications) may be prioritized during network congestion or emergency situations. The network congestion may occur when a wireless network channel condition of the wireless network exceeds a capacity threshold. In addition, categories of applications may be prioritized during non-ACDC situations where an operator is not bounded by network neutrality (i.e., a principle that Internet service providers should treat all data on the Internet equally and not discriminate against specific types of content or applications) and is legally allowed to apply different treatment to applications on its UEs and network in normal non-emergency situations.

The prioritization scheme may be achieved by assigning some kind of value to each application or application category on a preconfigured list of applications or application categories. The values may be numerical, alphabetical, textual or a combination thereof.

FIG. 1A illustrates an exemplary prioritization scheme of ACDC applications. In Option 1, Applications A and B are given a first priority level (i.e., N), applications C and D are given a second priority level (i.e., N+1), applications E and F are given a third priority level (i.e., N+2), and applications G and H are given a fourth priority level (i.e., N+3). Alternatively, the prioritization scheme may apply to ACDC application categories. For example, Application Categories A and B may be given a first priority level, wherein Application Category A includes applications Q and R and Application Category B includes application S and T. In Option 2, the applications and/or application categories may be prioritized with finer granularity (e.g., N, N+1, N+3 and so on).

When an ACDC/ASAC condition is activated, the UE may allow the initiations of the applications or application categories on the approved list. In the event when more than one application or application category is initiated on the UE, the UE may prioritize the initiations according to the prioritization value assigned to the applications or application categories. Therefore, an assumption may be made that all applications or application categories on the white list are allowed to be initiated by the UE. The UE may then prioritize among the different applications or application categories according to a priority level assigned to each application or application category if there is competing demands on the UE to execute these applications or application categories in multitasking scenarios.

In an alternative configuration, a network operator may activate different levels of ACDC/ASAC based on the network congestion conditions, thereby allowing only the prioritized applications allowed for that condition level and disallowing the rest of the applications on the white list. Thus, the network operator may allow only the prioritized application categories allowed for that condition level and disallow the rest of the application categories on the white list. The different levels of ACDC/ASAC may be useful in situations where the operator needs to ensure that certain applications on the white list are given priority access to the wireless network over the other applications on the list. For example, at the onset of a major earthquake, the operator may want to ensure that a Disaster Message Board is allowed to access the wireless network while video upload to YouTube (e.g., a specific application) be granted access 24 hours later when a different ACDC/ASAC condition level is activated. Alternatively, the operator may restrict all video streaming applications (e.g., a specific application category) for 24 hours at the onset of the major earthquake, while only allowing for emergency service applications to communicate with the wireless network.

FIG. 1B is an exemplary prioritization scheme illustrating how an operator may prioritize the various allowed applications on its ACDC or ASAC white list and the corresponding ACDC/ASAC condition levels when the applications are allowed to be initiated by the UEs. Alternatively, the prioritizations scheme in FIG. 1B may apply to specific application categories that are allowed based on the ACDC/ASAC condition levels. The values may be numerical, alphabetical, textual or a combination thereof. For example, "A" may indicate an emergency response application or an emergency response application category. As shown in FIG. 1B, "A" and "B" may be allowed to access the wireless network at condition level N, but "C" through "H" may not be allowed until a future time. For example, "E" and "F" may only access the wireless network when the wireless network allows condition N+2 and N+3.

As shown in FIG. 1B, when "C" through "H" are allowed to access the wireless network, "A" and "B" may also be allowed to access the wireless network. In other words, "A" and "B" may be allowed during condition levels N, N+1, N+2 and N+3. Therefore, "A" and "B" may be given a first priority level, "C" and "D" may be given a second priority level, "E" and "F" may be given a third priority level, and "G" and "H" may be given a fourth priority level. As shown in FIG. 1B, during a condition level of "N+1," "A" through "D" may be allowed to access the wireless network, but "E" through "H" are not allowed to access the wireless network, and so on.

FIG. 2 illustrates an exemplary implementation of a prioritization scheme for applications or application categories between a network and a user equipment (UE). The network may activate the ACDC/ASAC conditions, via an evolved node B (eNB), and the UE may initiate or operate applications or categories of applications according to the ACDC/ASAC conditions. The network may include a network element, such as the MME, ANDSF or a dedicated ACDC/ASAC server. Thus, the action of the ACDC/ASAC conditions may be initiated from the MME via the NAS protocol, the ANDSF through the OMA-DM protocol, or the dedicated ACDC/ASAC server via a hypertext transfer protocol (HTTP) protocol.

As shown in FIG. 2, the network may activate ACDC/ASAC condition level N. As a result, the UE may only initiate or operate applications A and B (or application categories A and B). Other applications or application categories on a white list are not allowed to be activated during condition level N. If the operator determines that a network congestion level is sufficiently alleviated to accommodate additional network traffic, the network may activate ACDC/ASAC condition level N+1. As a result, the UE may only initiate or operate applications A, B, C and D (or application categories A, B, C and D). In addition, the network may determine to activate ACDC/ASAC condition level N+3. As a result, the UE may initiate or operate applications A, B, C, D, E, F, G and H (or application categories A, B, C, D, E, F, G and H). In other words, all of the applications or application categories on the white list may be allowed to be activated by the UE.

An operator may be subject to different regulatory requirements within its service territory. For example, State X in Country A may have different regulatory requirements and priorities than State Y. In this case, the operator may configure the subscriber's UE and provision its wireless network to account for the differences between geographical regions. In one configuration, the UE may be preconfigured with the different white lists of the different regions. As the UE roams through different regions, the wireless network may dynamically activate the appropriate white list and deactivate the previous white list. For example, the UE may be preconfigured with white lists for geographical regions A, B and C. When the UE is in region A, only a white list corresponding to region A may be activated, but when the UE roams to region B, a white list corresponding to region B may be activated and the white list corresponding to region A may be deactivated.

In an alternative configuration, the UE may be preconfigured with only the appropriate white list of the home region when the subscriber signs up for service. As the UE roams to a different region, the wireless network may dynamically replace the existing white list with the newly governing white list. As an example, when in region A, the UE may receive a white list corresponding to region A. When the UE roams to region B, the UE may receive a white list corresponding to region B and the white list corresponding to region A may no longer be applicable to the UE.

When the UE roams outside of a home geographical region, the network operator in the geographical region that the UE is roaming in may determine whether or not to honor a white list that is currently being implemented at the UE. For example, the UE may be implementing a white list corresponding to region A and the UE may roam into region B. The wireless network operator in region B may determine whether the UE can continue using the white list corresponding to region A, or whether the UE's white list should be replaced with the white list corresponding to region B. In other words, the UE's white list for region A may not be honored by the network operator.

Figure 3:
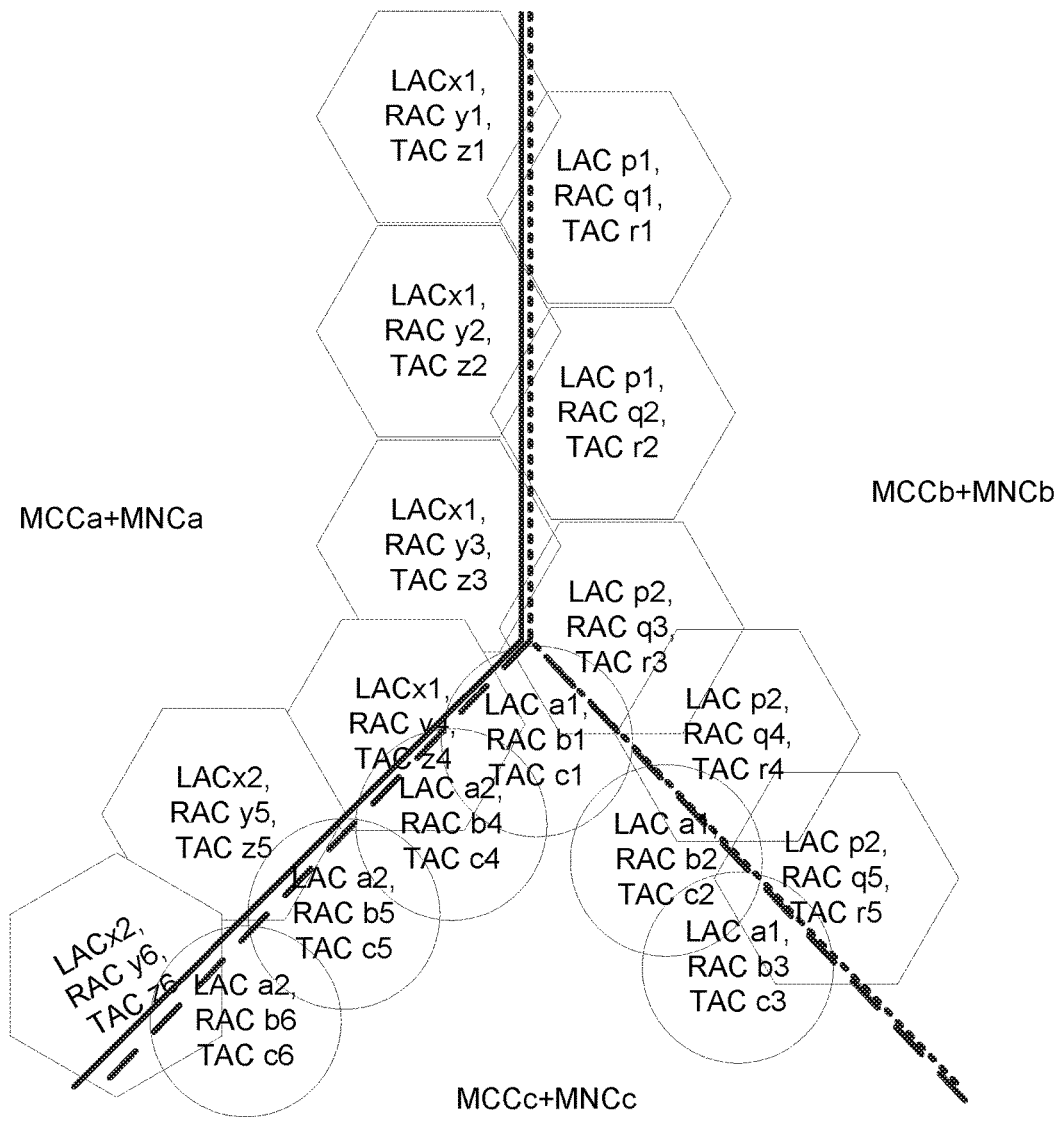
FIG. 3 illustrates a plurality of geographical region borders that are defined based on a combination of location area codes (LACs), routing area codes (RACs) and type allocation codes (TACs) in accordance with an example.

FIG. 3 illustrates a plurality of geographical region borders that are defined based on a combination of location area codes (LACs), routing area codes (RACs) and type allocation codes (TACs). In 3GPP systems, as well as many wireless networks, geographical state borders or national borders may be difficult to distinguish to the mobile equipment. While FIG. 3 illustrates distinct geographical borders, these borders may be served by various cells, e.g., Public Land Mobile Networks (PLMNs) of different countries or regions. Location related features, such as Cell IDs, Location Area Code (LACs), Routing Area Code (RACs) or Type Allocation Codes, Mobile Country Code (MCC) and Mobile Network Code (MNC) are generally not designed to provide an exact geographical mapping of a border. However, a combination of LACs or RACs or TACs may mark or distinguish the state of a country or nation. In other words, grouping LACs or RACs or TACs with similar characteristics or identifiers may infer the geographical region associated with the mobile device. Such national delineation may be regulated, controlled by the nation's regulatory body and be accepted and abided by the operators operating within that nation/country.

Figure 4:
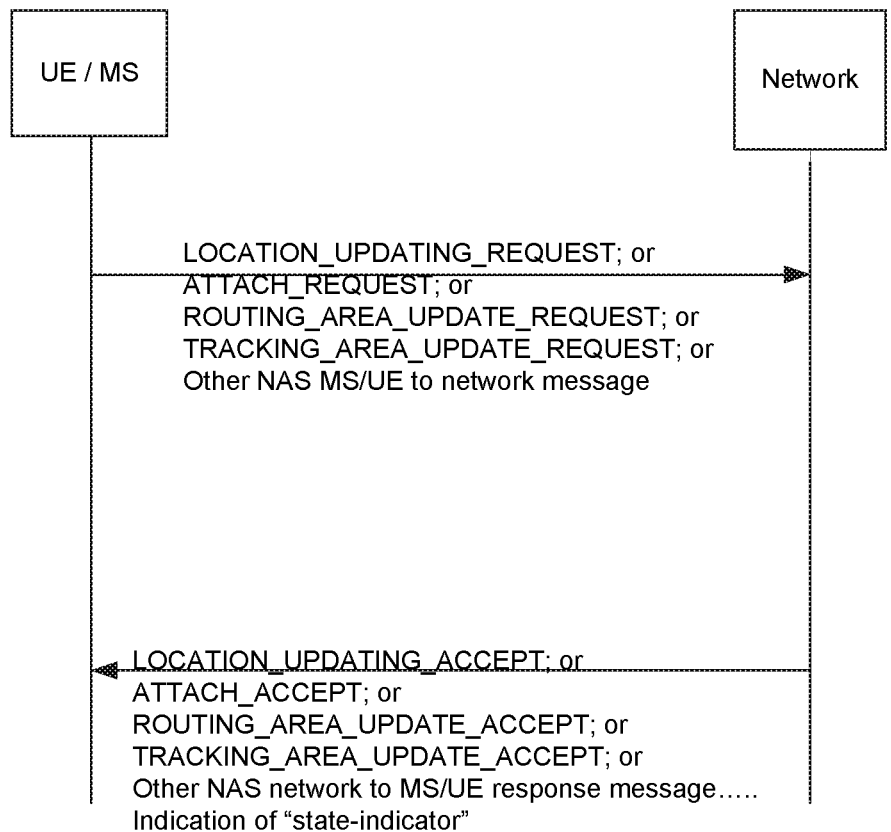
FIG. 4 illustrates a network element communicating a state indicator message to a user equipment (UE) in response to receiving a non-access stratum (NAS) message from the UE in accordance with an example.

FIG. 4 illustrates a network element communicating a state indicator message (or a regional indicator message) to a user equipment (UE) or a mobile station (MS). The state indicator message may include a current geographical region of the UE (e.g., Utah). The network element may communicate the state indicator message in response to non-access stratum (NAS) registration or a registration update performed by the UE. The UE may communicate a location updating request message, an attach request message, a routing area update request message, a tracking area update request message, or other types of NAS messages to the network. The network may respond with a location updating accept message, an attach accept message, a routing area update accept message, a tracking area update accept message, or other types of NAS network-to-UE response messages that include an indication of the state indicator. In an alternative configuration, the state indicator or region indicator may be broadcasted in system broadcast information.

The "state-indicator" may uniquely distinguish a state inside a country using an octet where the 8 bits is a binary decode of states. One octet or eight bits may suffice for the number of states in the United States (i.e., 50 states). In addition, one octet may be sufficient for countries such as Russia with 83 subdivisions, republics and/or territories.

Although mobile devices generally include global position system (GPS) capabilities to enable the mobile devices to know the state (or sub-region) associated with the mobile devices, such information does not generally indicate whether regional requirements are active. Therefore, GPS information may be used in addition to the state indicator message described above.

Figure 5:
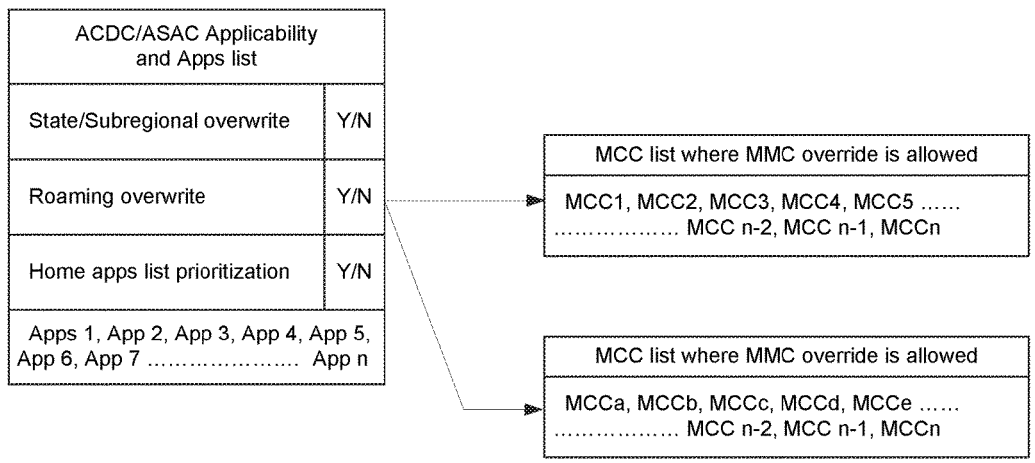
FIG. 5 illustrates Application Specific Congestion Control for Data Communications (ACDC)/Application and Service Access Control (ASAC) information included in an elementary file (EF) communicated to a mobile device in accordance with an example.

FIG. 5 illustrates Application Specific Congestion Control for Data Communications (ACDC)/Application and Service Access Control (ASAC) information included in an exemplary elementary file (EF) communicated to a mobile device. The terms "ACDC/ASAC information" and "ACDC/ASAC applicability and application categories list" as used herein may be used interchangeably. The EF file may be provisioned or pre-provisioned onto the mobile device using OMA-DM or a subscriber identity module toolkit (or SIM-Toolkit). The use OMA-DM or SIMToolkit for provisioning or pre-provisioning may include indications, means or triggers to allow mobile devices and operators/wireless networks to activate regional requirements and/or roaming requirements. The regional requirements may be activated when the mobile device is in a region that is different than a home region. The term "foreign region" used herein may generally refer to a region of the mobile device that is different than the home region. The foreign region may include a region that is roamed into by the mobile device.

The ACDC/ASAC information in the EF file may be for a universal subscriber identity module (USIM), a subscriber identity module (SIM) or a universal integrated circuit card (UICC) of the mobile device and communicated to the mobile device using a SIM toolkit. Alternatively, the ACDC/ASAC information may be specified as an Open Mobile Alliance management object (OMA-MO) and communicated to the mobile device using an Open Mobile Alliance Device Management (OMA-DM) protocol. In addition, both an EF file and an OMA-MO may be included during delivery, provisioning and pre-provisioning of the ACDC/ASAC information onto the mobile device.

As previously stated, the ACDC/ASAC information (or the ACDC/ASAC applicability and application categories list) may contain control and management information of ACDC/ASAC and the white listed applications and/or application categories. The list may include a number of indictors, such as whether a region (state or province etc.) of the home country can provide an override to the white listed applications. In other words, the list may indicate whether a network operator in the home region may override the white list currently being implemented at the UE with a new white list. The list may indicate whether a mobile device roaming outside its MCC can take ACDC/ASAC applicable information, such as ACDC/ASAC activation and an ACDC/ASAC preconfigured white list, of the foreign region. In other words, the list may indicate whether the mobile device may adopt the ACDC/ASAC scheme of the foreign region or continue using the ACDC/ASAC scheme that corresponds to the mobile device's home region. An MCC list with specific MCCs (e.g., MCC1, MCC2, MCCa, and MCCb) may be included when MMC override is allowed according to the ACDC/ASAC information. In one example, the mobile device may continue to use the previous ACDC/ASAC scheme if the new network operator honors the mobile device's previous ACDC/ASAC.

The ACDC/ASAC applicability and application categories list may include an indication of prioritization information of the white listed applications or application categories, i.e. whether the provided list of applications or application categories are in a prioritized order. For example, certain application categories (e.g., emergency response applications) may be given a higher priority as compared with other types of application categories (e.g., video sharing applications). The prioritization of ACDC/ASAC applications or application categories may be indicated using a prioritization level that is assigned by the network operator (e.g., N, N+1, N+2, and N+3). In addition, the list may include the preconfigured white list of applications or application categories, i.e. the white list of applications and/or application categories that are allowed to access the mobile network when ACDC/ASAC is activated for the network. Although the indicators described above are shown as part of the ACDC/ASAC applicability and application categories list, some or all of these indicators may be separately provided as standalone indicators.

For applicability of ACDC/ASAC when the mobile device is roaming and a roaming override is allowed, a second list may be generated with the MCCs where the mobile device is roaming that take into account ACDC/ASAC specific and applicable information of the foreign region. Alternatively, the second list may be generated with the MCCs where the mobile device is roaming that do not take into account ACDC/ASAC specific and applicable information of the foreign region.

In one configuration, more than one list may be provisioned or pre-provisioned onto the UE. Thus, the network operator may provision X number of lists, wherein each list corresponds to a particular region. Additional information may be included, such as distinguishing the state for which the list is applicable or distinguishing which is the home state of the UE. For example, the wireless network may provide a first list that corresponds to the UE's home region and a second list that corresponds to a foreign region.

Figure 6:
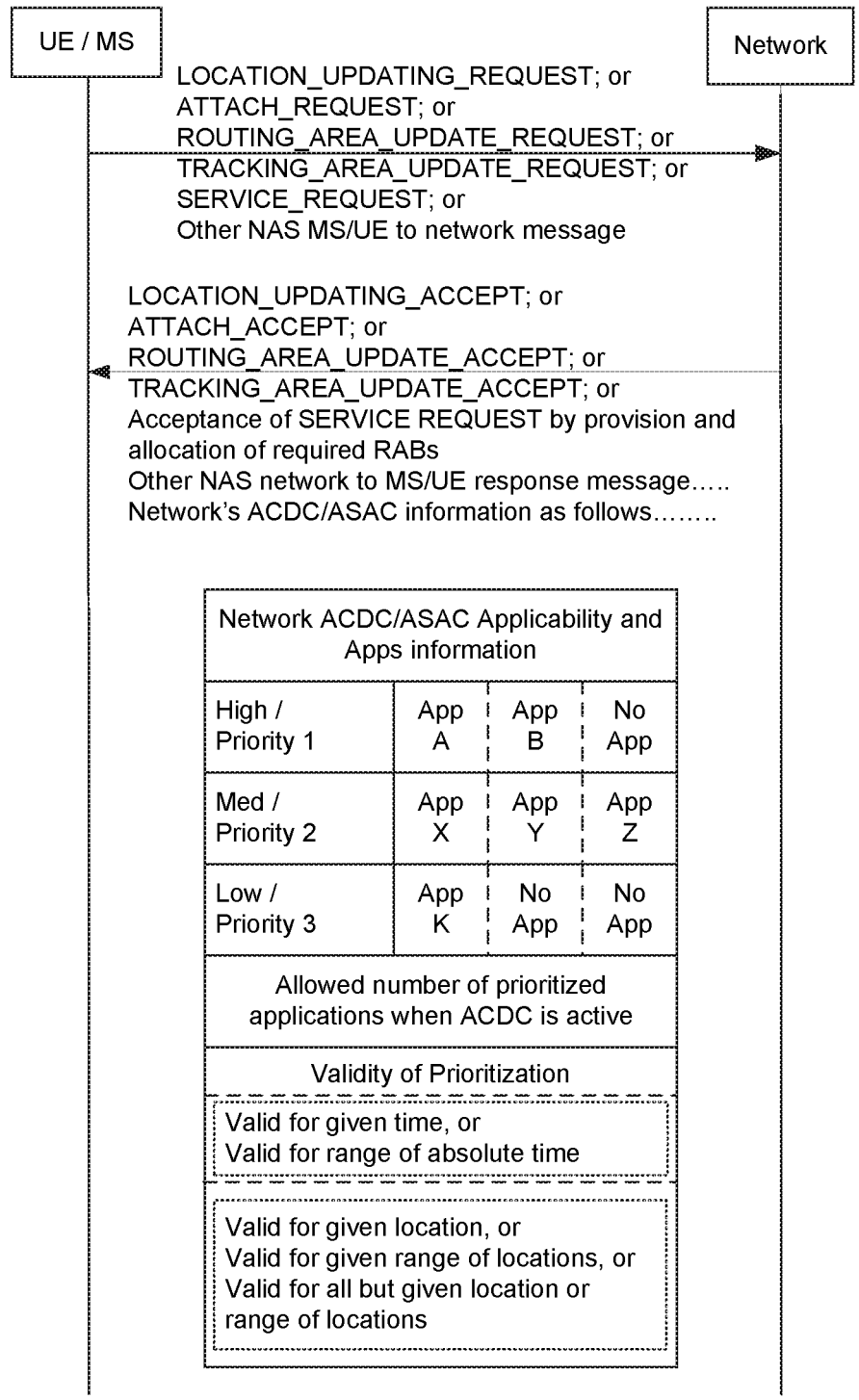
FIG. 6 illustrates a network element communicating Application Specific Congestion Control for Data Communications (ACDC)/Application and Service Access Control (ASAC) information in response to receiving a non-access stratum (NAS) message from the UE in accordance with an example.

FIG. 6 illustrates a network element communicating Application Specific Congestion Control for Data Communications (ACDC)/Application and Service Access Control (ASAC) information in response to receiving a non-access stratum (NAS) message from the UE. The NAS signaling may allow the wireless network to provide the UE with information about certain wireless network or regional conditions in more or less real time. The NAS signaling may utilize 3GPP standardized mechanisms for delivering the ACDC/ASAC applicable dynamic information to the UE. The Network ADCD/ASAC applicable information may be used by itself to fulfill local ACDC requirements or in conjunction with the ACDC information delivered by OMA-DM or the SIM Toolkit The network may activate the ACDC/ASAC conditions and the UE may initiate or operate applications or categories of applications according to the ACDC/ASAC conditions. The network may include a network element, such as the MME, ANDSF or a dedicated ACDC/ASAC server. Thus, the action of the ACDC/ASAC conditions may be initiated from the MME via the NAS protocol, the ANDSF through the OMA-DM protocol, or the dedicated ACDC/ASAC server via a hypertext transfer protocol (HTTP) protocol.

The UE or mobile station (MS) may perform a registration update, e.g., the UE may send a location updating request message, an attach request message, a routing area update request message, a tracking area update request message, or other types of NAS messages to the network. The network may respond with a location updating accept message, an attach accept message, a routing area update accept message, a tracking area update accept message, or other types of NAS network-to-UE response messages that include an indication of the state indicator. The network may accept the service request from the UE by the provision and allocation of radio access bearers (RABs). In addition, the network may provide the UE with the ACDC/ASAC information, as previously described in FIG. 5. The ACDC/ASAC information may be included in a list or an information element (IE) and may contain the necessary ACDC/ASAC applicable information local to the wireless network.

The network may provide the ACDC/ASAC information (i.e., the ACDC/ASAC applicability and application categories list) to the mobile device either without discrimination or when network knows that the mobile device supports dynamic ACDC/ASAC provisioning/handling. If the mobile device receives the ACDC/ASAC information and does not support dynamic ACDC/ASAC provisioning/handling, then the mobile device may ignore the ACDC/ASAC information.

If the mobile device receives the ACDC/ASAC information and does support dynamic ACDC/ASAC provisioning/handling, the mobile device may check its non-real time ACDC/ASAC information and, if allowed to take into account local ACDC/ASAC applicability information, the mobile device may continue with processing the local ACDC/ASAC applicability information. Therefore, the mobile device may check on non-real time ACDC/ASAC information populated by a home network operator (e.g., information from the home network operator indicating whether the mobile device is allowed to adopt a white list associated with a foreign network). In addition, mobile devices roaming in visited networks or foreign networks may be provided local ACDC/ASAC applicability information without having the full complement of non-real time ACDC/ASAC information.

The ACDC/ASAC information may include indications of prioritization or applications/application categories that are prioritized and therefore allowed when ACDC/ASAC is activated for the corresponding wireless network. The prioritization may be in the order of applications/application categories that are priority 1 or of high priority, applications/application categories that are priority 2 or medium priority, and then applications/application categories on priority 3 or low priority. For example "A" and "B" may have high priority, "X," "Y," and "Z" may have medium priority, and "K" may have low priority. In addition, the ACDC/ASAC information may indicate an allowed number of prioritized applications or application categories when ACDC is active in the wireless network.

The ACDC/ASAC information may identify the applications or application categories for each priority level (e.g., a priority level of 1, 2 or 3, or a priority level of high, medium or low). The application categories may include social networking applications, online shopping applications, news applications, educational applications, music applications, video streaming applications, and so on. In addition, the categories of applications may share other similarities, such as a category of applications that are most popular among females of ages 13-17. Each application category may include a plurality of specific applications. For example, the application category of music applications may include over a 100 specific music applications. These identified applications may or may not appear on the white list. While the number of identified applications or application categories is not restricted, the nature of the ACDC/ASAC feature is likely to result in a relatively small number of identified applications. In some examples, the network may indicate no applications or a selected number of applications depending on the level of network congestion.

As an example illustrated by FIG. 6, if ACDC/ASAC is active and the mobile device wants to start App Y and App K, then only App Y is started. Similarly, if the higher layers trigger App X, but App A and App B are also started, then App X will not be started.

For the identified applications and/or application categories and their corresponding priority level when ACDC/ASAC is active, the wireless network may indicate a valid time of the given ACDC/ASAC information. The indicated valid time may be an absolute time after which the ACDC/ASAC information is no longer valid. The valid time may indicate a start time and end time, i.e., a range of time. The valid time may indicate a number of seconds, minutes, hours, deci-hours, etc. that the ACDC/ASAC information is valid for since provided to the mobile device. If no valid time is given, the mobile device may consider the ACDC/ASAC valid until a next registration update or an update at a next request for service. When the valid time is still running at the next registration update, the next registration update information may clear out all previously provided ACDC/ASAC information. Unless the wireless network chooses not to update the ACDC/ASAC information (i.e., the ACDC/ASAC applicability and application categories list) in the next registration update, the current or presently available ACDC/ASAC information at the mobile device may continue to be valid.

For the identified applications and/or application categories and their corresponding priority level when ACDC/ASAC is active, the wireless network may indicate a valid geographical location to which the prioritized list of applications or application categories applies. The valid geographical location may be indicated in any of the 3GPP allowed location identifications, such as LAC, RAC, TAC, or even 3GPP defined Geo-coordinates or commonly described global positioning system (GPS) co-ordinates. Therefore, the prioritized list may not apply when the mobile device is outside of the valid geographical location. If no valid geographical location is given, the mobile device may consider the ACDC/ASAC information valid until a next registration update or update at next request for service. Even if the geographical location is given and the location is still valid at the next registration update, the next registration update information may clear out all previously provided ACDC/ASAC information. The ACDC/ASAC information may be flushed during a change of the Public Land Mobile Network (PLMN), although exceptions may be made when the mobile device changes to equivalent PLMNs (e.g., enhanced PLMNs) or equivalent home PLMNs (e.g., enhanced home HPLMNs).

In one configuration, the full complement of ACDC/ASAC information may not be implemented using individual network operators. For instance, the "Roaming overwrite" indication may not be adopted, and instead, individual network operators may have provisions in their roaming agreements with fellow network operators to allow or disallow applicability of ACDC/ASAC to the inbound roaming subscribers. Such contractual agreements may still require signaling solutions—as the visited network or foreign network may need to signal to the inbound roamer (i.e., the mobile device that has roamed to the foreign network) regarding allowed or not allowed applicability of ACDC/ASAC information.

Figure 7:
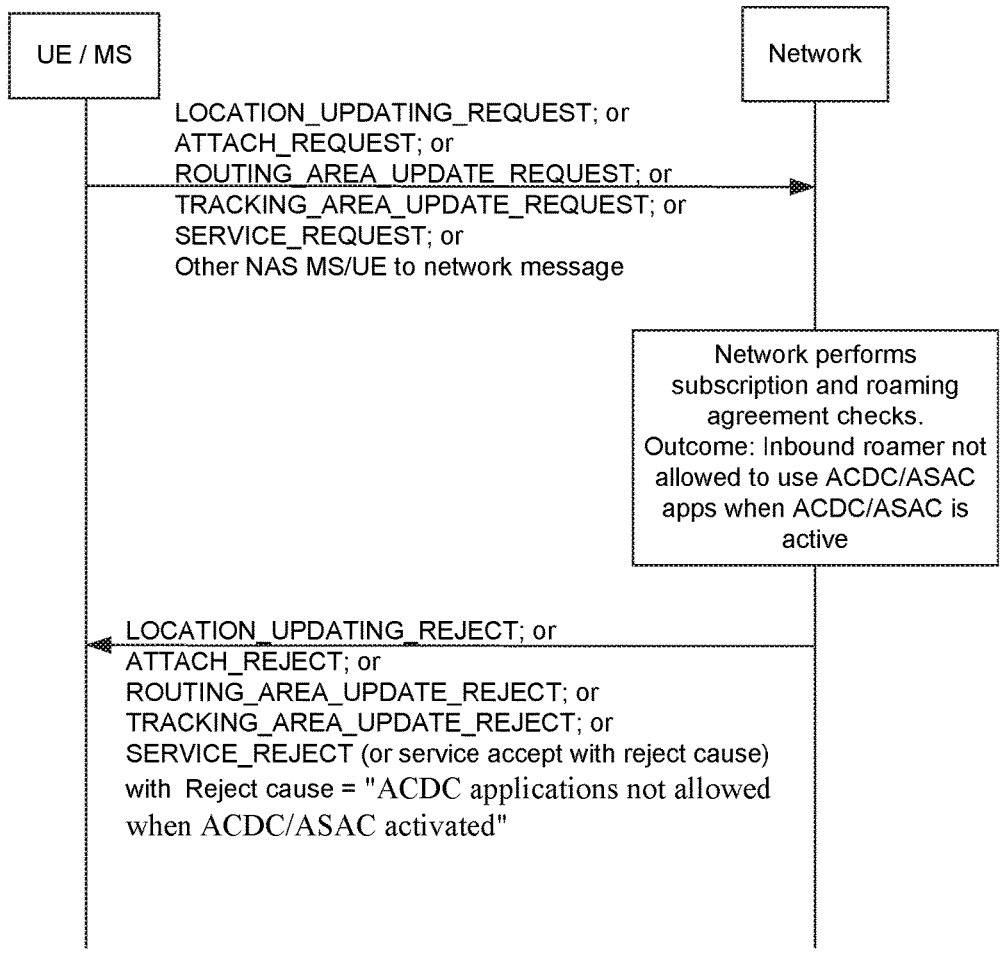
FIG. 7 illustrates a network element determining that no application categories on a preconfigured list of application categories are allowed to operate at a user equipment (UE) when Application Specific Congestion Control for Data Communications (ACDC)/Application and Service Access Control (ASAC) is activated and the UE is roaming outside a home geographical region in accordance with an example.

FIG. 7 illustrates a network element determining that no categories of applications on a preconfigured list of application categories are allowed to operate at a user equipment (UE) when Application Specific Congestion Control for Data Communications (ACDC)/Application and Service Access Control (ASAC) is activated and the UE is roaming outside a home geographical region. In other words, the network element may be in a foreign region (i.e., outside the home region associated with the UE) and does not allow the UE to operate ACDC/ASAC applications when the UE is roaming within the foreign region. The activation of the ACDC/ASAC conditions may be initiated from the MME via the NAS protocol, the ANDSF through the OMA-DM protocol, or the dedicated ACDC/ASAC server via a hypertext transfer protocol (HTTP) protocol.

When the mobile device performs a registration update, or when the mobile device requests for resources, the wireless network in response to that signaling may indicate a reject cause. The reject cause may indicate to the mobile device that ACDC/ASAC applications or application categories are not allowed when ACDC/ASAC is activated in the wireless network. When the mobile device receives the reject cause, the mobile device upon detecting that ACDC/ASAC is active in the wireless network may not initiate any of the ACDC/ASAC applications or application categories. The restriction may take place even if the UE has an ACDC white list. In addition, the imposition may apply until the next registration update or service update.

As shown in FIG. 7, the UE may communicate a location updating request message, an attach request message, a routing area update request message, a tracking area update request message, or other types of NAS messages to the network. The network may respond with a location updating reject message, an attach reject message, a routing area update reject message, a tracking area update reject message, or a service reject message. Alternatively, the network may respond with a service accept message with a reject cause, wherein the reject cause indicates that ACDC applications are not allowed when ACDC/ASAC is activated in the wireless network.

The registration updates may be accepted with a location updating accept message, an attach accept message, a routing area update accept message, a tracking area update accept message, or a service accept message and resources may be provided, but a reject cause may also be provided with these messages indicating that ACDC/ASAC applications are not allowed when ACDC/ASAC is active.

Figure 8:
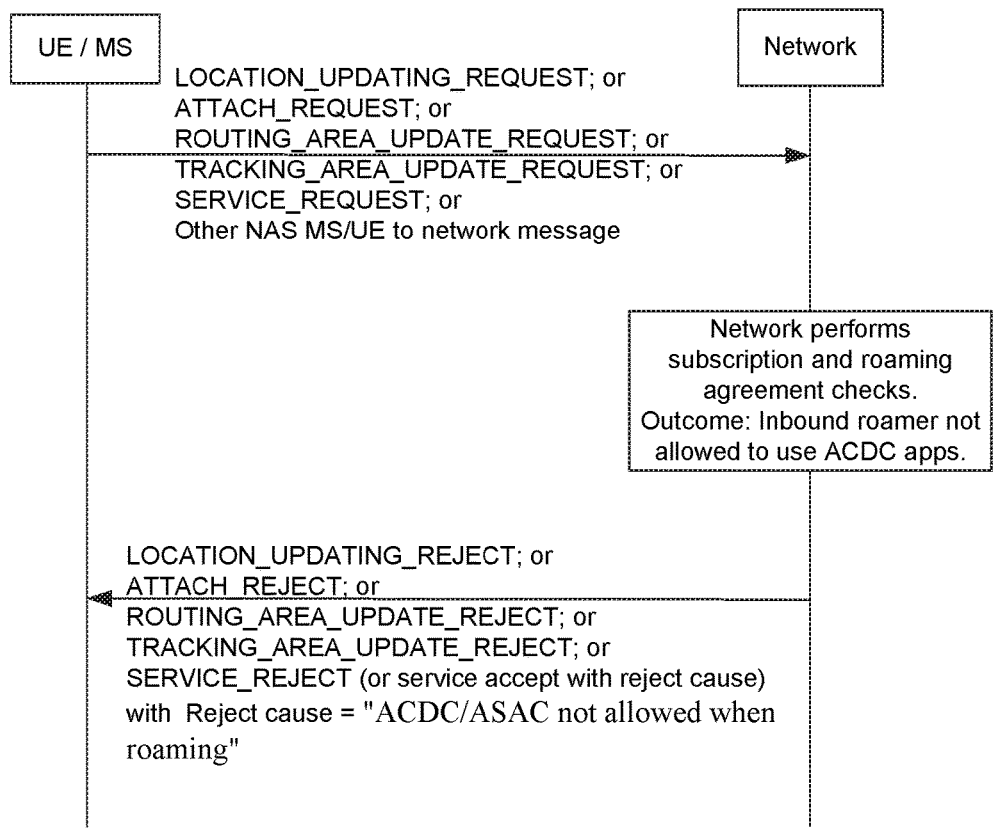
FIG. 8 illustrates a network element determining that no application categories on a preconfigured list of application categories are allowed to operate at a user equipment (UE) when the UE is roaming outside a home geographical region and regardless of whether Application Specific Congestion Control for Data Communications (ACDC)/Application and Service Access Control (ASAC) is activated in accordance with an example.

FIG. 8 illustrates a network element determining that no categories of applications on a preconfigured list of application categories are allowed to operate at a user equipment (UE) when the UE is roaming outside a home geographical region and regardless of whether Application Specific Congestion Control for Data Communications (ACDC)/Application and Service Access Control (ASAC) is activated. In other words, the network element may be within a foreign region and does not allow the UE to operate ACDC/ASAC applications when the UE is roaming within the foreign region. The activation of the ACDC/ASAC conditions may be initiated from the MME via the NAS protocol, the ANDSF through the OMA-DM protocol, or the dedicated ACDC/ASAC server via a hypertext transfer protocol (HTTP) protocol.

When the mobile device performs a registration update, or when the mobile device requests for resources, the network may respond with a reject cause indicating to the mobile device (i.e., an inbound roamer) that ACDC/ASAC applications are not allowed on a roaming UE. When the mobile device receives the reject clause, the mobile device may not initiate any of the ACDC/ASAC applications or application categories, regardless of whether ACDC/ASAC is active in the wireless network. The restriction may apply when UE has an ACDC white list and can be applicable until the next registration update or service update.

As shown in FIG. 8, the UE may communicate a location updating request message, an attach request message, a routing area update request message, a tracking area update request message, or other types of NAS messages to the network. The network may respond with a location updating reject message, an attach reject message, a routing area update reject message, a tracking area update reject message, or a service reject message. Alternatively, the network may respond with a service accept message with a reject cause, wherein the reject cause indicates that ACDC applications are not allowed when the UE is roaming.

The network may accept the registration updates and indicate that the ACDC/ASAC applications or application categories are not allowed when ACDC/ASAC is active. The registration updates may be accepted with a location updating accept message, an attach accept message, a routing area update accept message, a tracking area update accept message, or a service accept message and resources may be provided, but a reject cause may also be provided with these messages indicating that ACDC/ASAC applications are not allowed when the UE is roaming.

Figure 9:
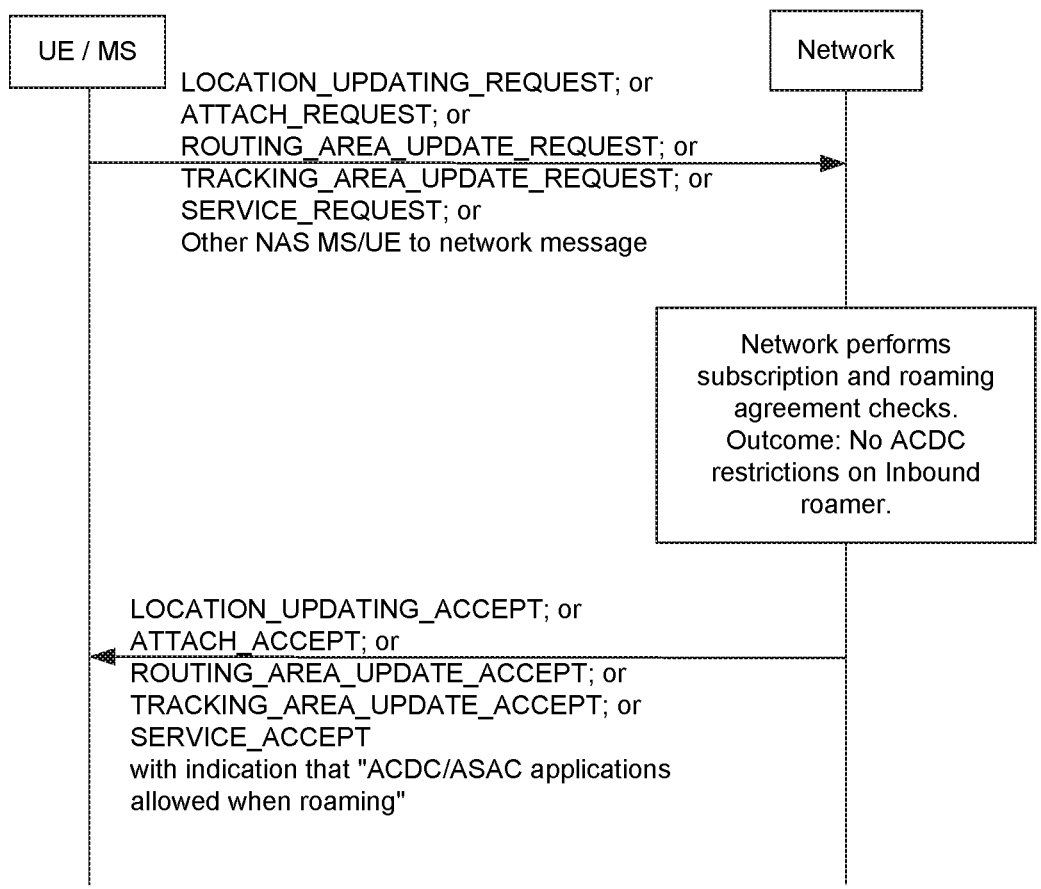
FIG. 9 illustrates a network element communicating Application Specific Congestion Control for Data Communications (ACDC)/Application and Service Access Control (ASAC) information to a user equipment (UE) indicating whether application categories on a preconfigured list of application categories are allowed to operate at the UE when the UE is roaming outside a home geographical region and ACDC/ASAC is activated in accordance with an example.

FIG. 9 illustrates a network element communicating Application Specific Congestion Control for Data Communications (ACDC)/Application and Service Access Control (ASAC) information to a user equipment (UE) indicating whether applications on a preconfigured list of application categories are allowed to operate at the UE when the UE is roaming outside a home geographical region and ACDC/ASAC is activated. The activation of the ACDC/ASAC conditions may be initiated from the MME via the NAS protocol, the ANDSF through the OMA-DM protocol, or the dedicated ACDC/ASAC server via a hypertext transfer protocol (HTTP) protocol.

The network may allow the mobile device (i.e., the inbound roamer) to operate ACDC/ASAC applications or categories of ACDC/ASAC applications. When the mobile device performs a registration update, or when the mobile device requests for resources, the network may respond by indicating that ACDC/ASAC applications are allowed when the UE is roaming subject to the activation of ACDC/ASAC in the network. When the mobile device receives the indication that ACDC/ASAC applications are allowed when the UE is roaming, the mobile device may know that ACDC/ASAC applications indicated in the home public land mobile network (HPLMN) provisioned white list may be run when ACDC/ASAC is active in the visited public land mobile network (VPLMN).

As shown in FIG. 9, the UE may communicate a location updating request message, an attach request message, a routing area update request message, a tracking area update request message, or any other type or level of signaling messages between UE and the network. The network may determine no ACDC restrictions for the UE. The network may respond with a location updating accept message, an attach accept message, a routing area update accept message, a tracking area update accept message, or a service accept message (or any other type or level of signaling message), wherein these messages indicate that ACDC/ASAC applications are allowed when the UE is roaming.

In one configuration, the ACDC/ASAC white list in the UE may be updated using paging messages and a System Information Block (SIB). The UE may be updated using the paging message and SIB in Universal Terrestrial Radio Access Network (UTRAN) and Evolved Universal Terrestrial Radio Access Network (E-UTRAN) systems. An evolved node B (eNB) may communicate an ACDC/ASAC whitelist notification in the paging message to the UE. The ACDC/ASAC whitelist notification may notify the UE that an ACDC/ASAC SIB is being broadcast by the eNB.

The ACDC/ASAC whitelist notification may include an ACDC/ASAC Group ID (i.e. group of UEs for which the ACDC/ASAC white list applies). If an ACDC/ASAC Group ID is included, only mobile devices belonging to the corresponding ACDC/ASAC group may need to acquire the ACDC/ASAC SIB. If an ACDC/ASAC Group ID is not included, all devices configured for ACDC/ASAC may acquire the ACDC/ASAC SIB. In a LTE system, the scheduling information of the ACDC/ASAC SIB may be provided in a system information block type 1 (SIB1). The mobile device configured for ACDC/ASAC may first acquire the SIB1 information and then subsequently acquire the ACDC/ASAC SIB based on ACDC/ASAC SIB scheduling information included in the SIB1.

Therefore, the SIB may include an indication of whether ACDC/ASAC is active in the wireless network. Additional information may be sent over the SIBs to selected groups or collections of mobile devices. The additional information may include indications in the form of specific ranges of international mobile subscriber identities (IMSIs), temporary mobile subscriber identities (TMSIs), globally unique temporary identifiers (GUTIs) or other 3GPP unique identifiers of mobile equipment or mobile subscriptions or mobile users.

The additional information may include indications of specific categories of mobile devices. The specific categories of mobile devices may be in any form of new identity or previously defined identity, such as an access class of the mobile device. The network, broadcast subsystem, and the mobile device may all share the same understanding of the specific categories. For instance, the wireless network may not use power class as a categorization, while the mobile devices use access class as the categorization. In other words, both sides of the radio interface may use the same categorization. Although a number of different (new or existing) categories may be adopted, generally only one category is used at any given time. Thus, apart from broadcasting the category of mobile devices affected by the activation of ACDC/ASAC, the wireless network may indicate which category is to be used as the selective criteria.

In one example, the SIB may indicate that if ACDC/ASAC is active in the wireless network, whether the ACDC/ASAC is applicable to inbound roamers without exceptions. In other words, the inbound roamers may include UEs that are roaming in a foreign region and are outside the UE's home region.

In one example, the SIB may indicate that if ACDC/ASAC is active in the wireless network, whether the ACDC/ASAC is applicable to inbound roamers with exceptions. These exceptions may be identified based on Public Land Mobile Networks identifiers (PLMN IDs), ranges of PLMN IDs, Mobile Country Codes (MCCs), or ranges of MCCs with such exceptions. In other words, the PLMN IDs and MCCs that are not identified are not exempted. Alternatively, these exceptions may be identified based on PLMN IDs, ranges of PLMN IDs, MCCs, or ranges of MCCs without exceptions. In other words, the PLMN IDs and MCCs that are not identified are exempted. In addition, the identification of specific categories may provide finer granularity when selecting the mobile devices that are or are not to follow the applicability of ACDC in the wireless network.

The information described above may be provided to the mobile device over the SIBs or other selected 3GPP broadcast techniques. The mobile device may use to broadcast information to know if the mobile device belongs to the specific category that is being broadcasted. Even if the category has been previously defined by 3GPP, the mobile device may determine whether the mobile device's identity matches with the category that was broadcasted over the SIBs.

The UE may be provided with information indicating that a new categorization has been specified. In one example, the mobile device's SIM/USIM may be pre-provisioned with the identity/information of its category. The mobile may also receive the identity/information of its category via SMS provisioning or through OMA DM. If the UE knows its category and if that category matches with the category that is broadcasted over the SIB with respect to ACDC/ASAC, then what is applicable for ACDC/ASAC as indicated over the SIB may apply for the mobile device and the mobile device may act accordingly. Such ACDC/ASAC applicable information on the mobile device may be based on home operator policies and may be home operator configurable subjecting the UE to roamed to (i.e., visited) PLMN's allowance/activation of ACDC/ASAC. Such information may be configured as part of mobile configuration information (i.e. on SIM/USIM) and may include indications to guide the roaming mobile device to utilize Visited networks ADCD/ASAC activation information over the SIBs or broadcast messages/information. In addition, the mobile device may be subjected to ACDC based on the configuration of ACDC in the mobile device using OTA provisioning techniques, such as USIM-OTA or OMA-DM.

In one configuration, application specific access control can be provided during a congestion situation. For example, the ACDC/ASAC functionality can be implemented across the UE and the ACDC/ASAC server. The ACDC/ASAC server is a network entity that provisions the ACDC/ASAC white lists on the UE. In addition, the ACDC/ASAC server can be responsible for activating/deactivating and managing the overall ACDC/ASAC functionality from the mobile network operator (MNO) perspective.

Different applications on an approved list of applications can be prioritized when ACDC/ASAC is activated. The prioritization scheme can be achieved by assigning a value to each application on the list of applications. The value can be numerical, textual, alphabetical, or a combination thereof. The values can optionally be a Fully Qualified Domain Name (FQDN). An operator can prioritize various allowed applications on its ACDC/ASAC white list, wherein each allowed application includes at least one corresponding condition level during which the application is allowed to be initiated by the UE. When an ACDC condition level is activated, the UE can allow the initiations of only the applications on the approved list. In other words, the UE can only allow certain applications to communicate with the network, while other applications are not allowed to communicate with the network, although the applications that do not access the network may be locally executed on the UE. When more than one application is initiated on the UE, the UE can prioritize the initiations according to a prioritization value assigned to the applications. When the ACDC condition is activated, applications that are not on the approved list cannot be initiated (i.e., the applications are barred from communicating with the network).

The classification of applications based on categories of applications can offer a number of advantages. For example, the applications belonging to each category can be modified over time without impacting the various specifications. In other words, although the specific applications in category A can be changed, these changes do not modify the condition levels during which applications in category A are allowed to access the network. In addition, operators can choose the applications for each category based on their specific business model or other characteristics.

In one example, an operator can be subject to different regulatory requirements within its service territory. For example, State X in Country A can have different regulatory requirements and priorities than State Y in Country A. In this case, the operator can configure a subscriber's UE and provision the network to account for the differences between State X and State Y. The regional/state prioritization can be accomplished in several manners. In one example, the UE can be preconfigured with the different white lists of the different regions. As the UE roams through different regions, the network can dynamically activate the appropriate white list and deactivate the previous white list. In another example, the UE can be preconfigured with only the appropriate white list of a home region when the subscriber signs up for the service. As the UE roams to a different region, the network can dynamically replace the white list with a newly governing white list (i.e., a white list that corresponds to the different region).

As described in further detail below, in one example, the network may not activate and deactivate various white lists. Rather, the applications can be classified into different groups or categories depending on the region. In addition, other techniques can be used for prioritizing the applications and application categories, such as usage of barring parameters or usage of a bitmap.

In one example, rather than having a list of applications, the operator can define categories of applications, wherein a set of applications are defined for each category. As an example, the operator can define five categories: category A, category B, category C, category D, and category D. Category A can include high priority applications, such as a disaster message board, etc. Category B can include applications related to voice calls, such as Voice over Internet Protocol (VoIP). Category C can include streaming applications, such as video streaming applications or audio streaming applications. Category D can include web browsing applications. Category E can include interactive applications, such as video games.

In order to provide additional granularity, the operator can create a larger number of categories. If the differentiation of application classification per a given area is relatively large, then the relatively large number of application categories can affect memory availability. Therefore, the large number of different applications can be classified in a fixed set of categories, and the network can send the application categories to the UE. In other words, the network can send ACDC/ASAC information that includes definitions of the application categories to the UE, thereby enabling the UE to prioritize certain application categories when there is network congestion and ACDC is activated in the network. The network can send the ACDC/ASAC information to the UE via a dedicated message, or alternatively, the network can broadcast the ACDC/ASAC information to the UE. Optionally, the information related to application categories can be configured via the Open Mobile Alliance Device Management (OMA-DM) protocol, where the network sends a Management Object file to the UE with the information. In one configuration, the ACDC/ASAC information describing the application categories can be pre-configured in the UE.

In one example, the application categories that are provisioned in the network can be A, B, C, D and E. Each of the application categories can be allowed during one or more defined condition levels. For example, category A can be allowed during condition levels of N, N+1, N+2, N+3 and N+4. Category B can be allowed during condition levels of N+1, N+2, N+3 and N+4. Category C can be allowed during condition levels of N+2, N+3 and N+4. Category D can be allowed during condition levels of N+3 and N+4. Category E can be allowed during the condition level of N+4. When an ACDC condition level is activated, then the UE can allow the initiations of only the applications on the approved categories.

In the previous example, if the condition level of N+1 is activated in the network, then the UE can allow applications in category A and category B to communicate with the network, but applications in categories C, D and E are not allowed to communicate with the network. As another example, if the condition levels of N and N+3 are activated in the network, then the UE can allow applications in categories A, B, C and D to communicate with the network, but application E is not allowed to communicate with the network. As previously explained, the network can activate a specific condition level (e.g., N, N+1, N+4) for a defined period of time when there is congestion in the network. By allowing only certain applications to communicate with the network when the network is congested, and not allowing other applications to communicate with the network when the network is congested, the amount of data exchanged in the network can be minimized, and therefore, the network congestion can be alleviated or reduced. After the defined period of time (e.g., when the network traffic has reached an acceptable level), the ACDC condition levels can be deactivated and the UE is not restricted from allowing certain applications to communicate with the network.

FIG. 10 is an exemplary table illustrating a probability of access and a time of barring for a plurality of application categories. In one configuration, the ACDC/ASAC information communicated from the network to the UE can include barring parameters for each application category, similar to access class barring (ACB) barring parameters as described in 3GPP Technical Specification (TS) 36.331. The barring parameters can include the probability of access and the time of barring. The probability of access can indicate a defined probability (e.g., expressed as a percentage) of applications in a particular application category being allowed to access the network from the UE when ACDC/ASAC is activated in the network. The time of barring can define a period of time (e.g., in seconds) that applications in a particular application category are barred from being able to access the network from the UE when ACDC/ASAC is activated in the network.

As shown in the example of FIG. 10, the ACDC/ASAC information can describe a number of application categories, such as A, B, C, D and E. For each application category, there can be a corresponding probability of access and a time of barring. In other words, the network can configure the probability of access and the time of barring for each of the application categories for the UE. When an ACDC/ASAC condition is activated, the UE can follow the barring parameters for each category of applications. If a specific category of applications is not to be barred even when the ACDC/ASAC condition is activated, then the barring parameters can be set accordingly.

In one example, the UE can receive the ACDC/ASAC information containing the barring parameters from the network. If the network becomes congested (e.g., a capacity threshold of the wireless network is exceeded), then ACDC/ASAC can be activated in the network. When the ACDC/ASAC is activated, the UE can follow the barring parameters included in the ACDC/ASAC information. As non-limiting examples, with respect to category A, the probability of access (i.e., the probability that the UE is allowed to use applications in category A) can be 80% and the time of barring can be 2 seconds, and with respect to category E, the probability of access can be 10% and the time of barring can be 30 seconds.

In one configuration, the ACDC/ASAC information communicated from the network to the UE can include a bitmap indicating which categories of applications are allowed and which categories are not allowed when ACDC/ASAC is activated in the network. As a non-limiting example, the ACDC/ASAC information can include a bitmap of [0 1 0 1 0], which indicates that categories A, C and E are not barred (i.e., allowed to operate on the UE) and categories B and D are barred (i.e., not allowed to operate on the UE). In other words, a "0" in the bitmap can indicate that a particular application is not barred, whereas a "1" in the bitmap can indicate that the particular application is barred. The number of bits used to represent the bitmap can depend on the number of possible application categories that are defined by the network operator. When an ACDC condition is activated and the bitmap is used, the barring level can be "barred" or "not barred" with no time parameters defined.

In one example, the UE can receive the ACDC/ASAC information with the bitmap from the network, and when the network activates the ACDC/ASAC, the UE can allow certain application categories and not allow certain application categories based on the bitmap. Since the bitmap includes only a "1" or a "0," the probability of barring a particular application category can be 100% or 0%, respectively. Based on the bitmap, the application categories can either be barred or not barred for an unending period (e.g., the time of barring for a particular application category is infinite until a decision to unbar the application category is made). An application category can be switched from "barred" to "not barred," or vice versa, when the network sends a modified bitmap to the UE. Thus, the UE can implement only the latest bitmap received from the network, and the UE will continue to implement that bitmap until a subsequent bitmap is received from the network.

In one example, the ACDC/ASAC information (e.g., the application categories containing the set of applications and the condition levels, the barring parameters, the bitmap, etc.) can be preloaded onto the UE. In alternative examples, the ACDC/ASAC information can be communicated from the network to the UE when the UE registers with the network, or upon the UE roaming into a defined geographical region. The set of applications can be categorized into various categories of applications based on at least one of: a location area code (LAC), a routing area code (RAC), or a type allocation codes (TAC).

FIG. 11 is an exemplary table illustrating a prioritization of Application Specific Congestion Control for Data Communications (ACDC)/Application and Service Access Control (ASAC) application categories for various geographical locations with respect to a condition level. Each geographical region can define a different set of applications in each application category. The geographical region can be a particular country, state, city, etc. The geographical region can be a particular tracking area. The geographical region can also be a particular set of cells. In addition, each application category can be associated with one or more condition levels (e.g., N, N+1, N+2, N+3, and N+4). As an example, a disaster message board may be available in some countries, but not other countries. Even when the disaster message board is available in a given country, this application can be included in an application category with a reduced (or increased) priority level as compared to other countries.

As shown in FIG. 11, application 1 can be included in category A for all three countries (e.g., MCC1, MCC2, MCC3), but application 2 can be included in category A when the device is in MCC1 and application 2 can be included in category C when the device is in MCC2 or MCC3. Thus, application 2 can be assigned a higher priority level when the device is in MCC1, but a lower priority level when the device is in MCC2. As another example, application 4 can be included in category B when the device is in MCC1 or MCC2, but application 4 can be included in category D when the device is in MCC3. Some applications may be relatively important or useful in certain countries (or regions), but relatively less important or useful in other countries (or regions). Therefore, depending on the country, the same application can be included in an application category with a higher priority level or a reduced priority level. As a non-limiting example, when congestion is present and ACDC is activated, a video streaming application category can be assigned a third priority level in a first country, but the video streaming application category can be assigned a fifth priority level in a second country.

FIG. 12 is an exemplary table illustrating a prioritization of Application Specific Congestion Control for Data Communications (ACDC)/Application and Service Access Control (ASAC) application categories for various geographical locations with respect to a priority level. Each application category (e.g., categories A, B, C, D and E) can include a set of applications. For example, category A can include applications 1, 2 and 3. Each application can be applicable in a certain country or region. In addition, each application category can be associated with the priority level (e.g., P1, P2, P3, P4 or P5). In one example, application category A can be associated with P1, application category B can be associated with P2, and so on.

As shown in FIG. 12, application 3 can be included in category A when the device is in MCC3 and assigned a priority level of P1. In other words, when the device is in MCC3, application 3 has a highest priority level (i.e., P1). The same application can be included in category C when the device is in MCC1 and assigned a priority level of P3. In other words, when the device is in MCC1, application 3 has a third highest priority level (i.e., P3).

In one configuration, the exemplary table illustrated in FIG. 12 can be preconfigured in the UE. Based on the country in which the UE resides, the UE can receive ACDC/ASAC information specific to the values of P1, P2, P3, P4 or P5. For example, if the UE is located within MCC1, the UE can only receive values for the applicable application categories. In this example, the UE can only receive values for application categories A, B, and C since there is no definition of application categories D and E in MCC1. Therefore, the UE can receive the values of P1, P2 and P3, but the UE does not receive the values of P4 and P5. As a result, the amount of signal overhead is reduced because the UE only receives the relevant ACDC/ASAC information for the specific country in which the UE is located. As another example, if the UE is within MCC3, then the network within MCC3 only has to broadcast the values of P1, P3, P4 and P5, but not the value of P2. Each country can broadcast its own values to the UE when the UE is within that country.

FIG. 13 is an exemplary table illustrating a plurality of priority levels with respect to geographical locations. In other words, the priority levels or condition levels (e.g., P1, P2, P3, P4 and P5) can be defined per country. The table shown in FIG. 13 can be preconfigured in the UE. In one example, for P1, MCC1, MCC2 and MCC3 can each be associated with a separate set of condition levels. In another example, for P2, MCC1, MCC2 and MCC3 can each be associated with the same set of condition levels (e.g., N+1, N+2, N+3, and N+4). In one configuration, each priority level can be associated with a particular application category. For example, P1 can be associated with application category A, P2 can be associated with application category B, and so on.

In one example, if the UE is in a certain region (e.g., MCC1), the network can send a set of condition levels that applicable for P1, P2, P3, P4 and P5. For example, if the UE is in MCC1, the network can indicate that P1 is associated with the condition levels of N, N+1, N+2, N+3, and N+4. As another example, if the UE is in MCC3, the network can indicate that P5 is associated with the condition level of N+4. Therefore, the amount of signal overhead is reduced because the UE only receives the set of condition levels with respect to the priority level for a specific country in which the UE is located.

The UE can be preconfigured with the set of allowed condition levels. For example, the UE can be preconfigured to know that category A is allowed during condition level P1, category B is allowed during condition level P2, category C is allowed during condition level P3, category D is allowed during condition level P4, and category E is allowed during condition level P5. At a later time, the network can configure the different values of P1, P2, P3, P4 and P5 depending on the location (e.g., country) in which the UE is located. In one example, the values of P1, P2, P3, P4 and P5 can be preconfigured per country (as shown in FIG. 13). In other words, the allowed condition values in MCC1, MCC2 and MCC3 can be defined with respect to P1, P2, P3, P4 and P5. For example, for P1, the set of allowed condition levels can be N, N+1, N+2, N+3, and N+4 for MCC1, the set of allowed condition levels can be N+1, N+2, N+3, and N+4 for MCC2, the set of allowed condition levels can be N+2, N+3, and N+4 for MCC3.

In one configuration, the ACDC/ASAC information (e.g., the mapping between application categories/groups and applications) and updates to the ACDC/ASAC information can be provided to the UE in a variety of manners. In one example, the ACDC/ASAC information can be provided from the network to the UE using an Open Mobile Alliance Device Management (OMA-DM) protocol. In another example, the ACDC/ASAC information can be provided from the network to the UE via over-the-air (OTA) updates. In one configuration, the ACDC/ASAC information can be provided from the network to the UE via a broadcast channel, or alternatively, the UE can receive the ACDC/ASAC information via dedicated signaling.

In one example, the network can receive a location area update request message, a routing area update request message, or a tracking area update request message from the UE. In response, the network can communicate the ACDC/ASAC information to the UE via dedicated signaling, wherein the dedicated signaling includes at least one of a location area update accept message, a routing area update accept message, or a tracking area update accept message.

Figure 14:
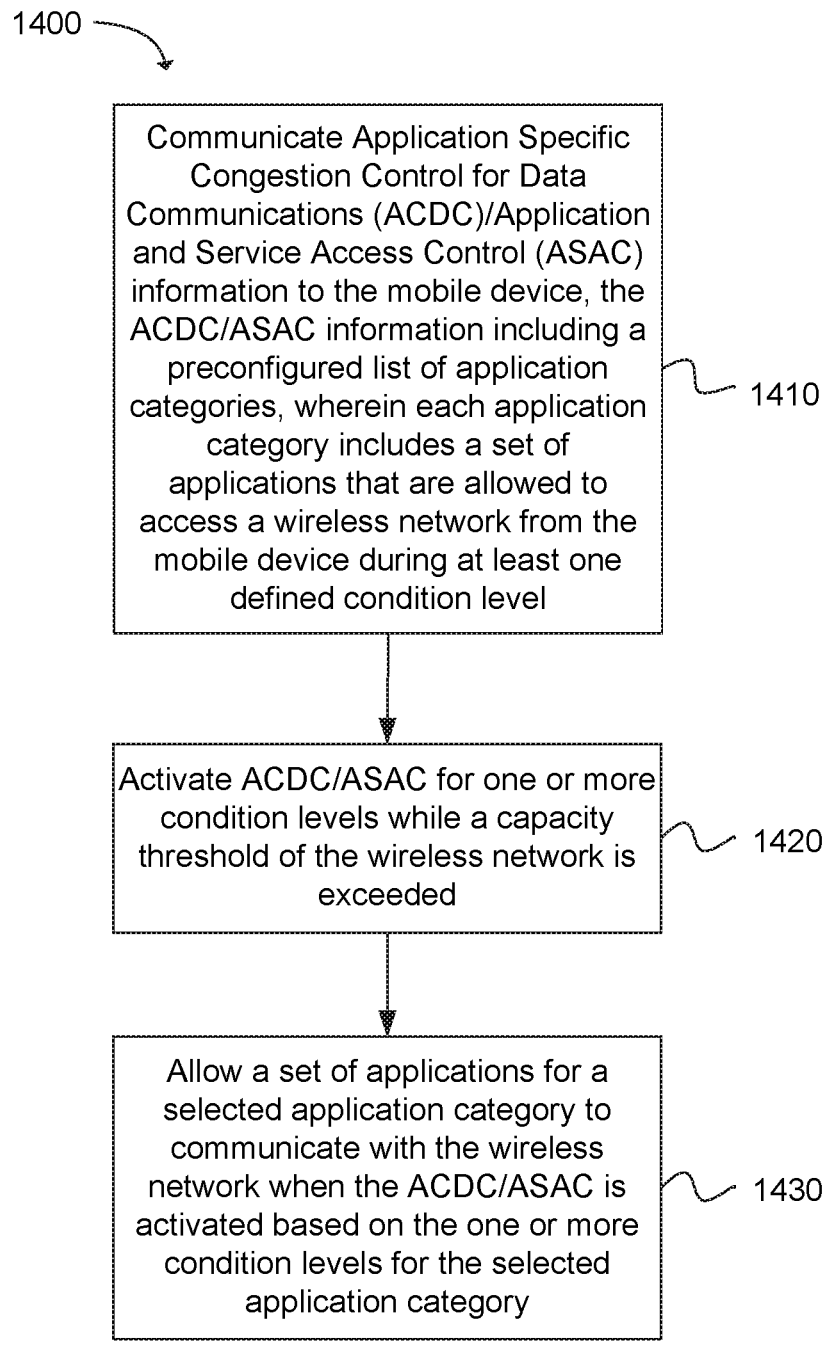
FIG. 14 depicts functionality of a wireless network element operable to provision categories of applications on a mobile device in accordance with an example.

Another example provides functionality 1400 of a wireless network element operable to provision categories of applications on a mobile device, as shown in the flow chart in FIG. 14. The functionality may be implemented as a method or the functionality may be executed as instructions on a machine, where the instructions are included on at least one computer readable medium or one non-transitory machine readable storage medium. The functionality can be implemented using one or more processors of the machine. The wireless network element can be configured to communicate Application Specific Congestion Control for Data Communications (ACDC)/Application and Service Access Control (ASAC) information to the mobile device, the ACDC/ASAC information including a preconfigured list of application categories, wherein each application category includes a set of applications that are allowed to access a wireless network from the mobile device during at least one defined condition level, as in block 1410. The wireless network element can be configured to activate ACDC/ASAC for one or more condition levels while a capacity threshold of the wireless network is exceeded, as in block 1420. The wireless network element can be configured to allow a set of applications for a selected application category to communicate with the wireless network when the ACDC/ASAC is activated based on the one or more condition levels for the selected application category, as in block 1430.

In one example, the ACDC/ASAC information communicated to the UE indicates a probability of access and a time of barring for each of the application categories, wherein the set of applications for the selected application category are allowed to communicate with the wireless network in accordance with the probability of access and the time of barring when the ACDC/ASAC is activated for the wireless network. In another example, the ACDC/ASAC information communicated to the UE includes a bitmap indicating the application categories that are allowed to access the wireless network when the ACDC/ASAC is activated for the wireless network, wherein a "0" in the bitmap indicates that a particular application category is not barred and a "1" in the bitmap indicates that the particular application category is barred, wherein the set of applications for the selected application category are allowed to communicate with the wireless network in accordance with the bitmap when the ACDC/ASAC is activated for the wireless network.

In one example, the ACDC/ASAC information is preloaded in the mobile device or conveyed to the mobile device upon registration of the mobile device. In another example, the ACDC/ASAC information includes one or more associated regions for each application in the selected application category to enable each application to operate in a different category based on the associated region in which the mobile device is located.

In one configuration, the ACDC/ASAC information includes at least one allowed condition level for each region to enable each application category to operate with a defined allowed condition level based on an associated region in which the mobile device is located. In another configuration, the ACDC/ASAC information includes access parameters for each region to enable each application category to operate with a defined access parameter based on an associated region in which the mobile device is located, wherein the access parameters include a probability of access and a time of barring. In yet another configuration, the wireless network element includes an ACDC/ASAC server.

In one example, the one or more processors are further configured to communicate the ACDC/ASAC information to the mobile device via dedicated signaling, wherein the dedicated signaling includes at least one of a location area update accept message, a routing area update accept message, or a tracking area update accept message. In another example, the one or more processors are further configured to communicate the ACDC/ASAC information to the mobile device in response to receiving at least one of: a location area update request message, a routing area update request message, or a tracking area update request message from the mobile device.

In one configuration, the one or more processors are further configured to communicate the ACDC/ASAC information to the mobile device via a broadcast channel. In another configuration, the one or more processors are further configured to communicate the ACDC/ASAC information to the mobile device using an Open Mobile Alliance Device Management (OMA-DM) protocol. In yet another configuration, the one or more processors are further configured to communicate the ACDC/ASAC information to the mobile device via over-the-air (OTA) updates. In addition, the set of applications are categorized into various categories of applications based on at least one of: a mobile country code (MCC), a location area code (LAC), a routing area code (RAC), or a type allocation codes (TAC).

Figure 15:
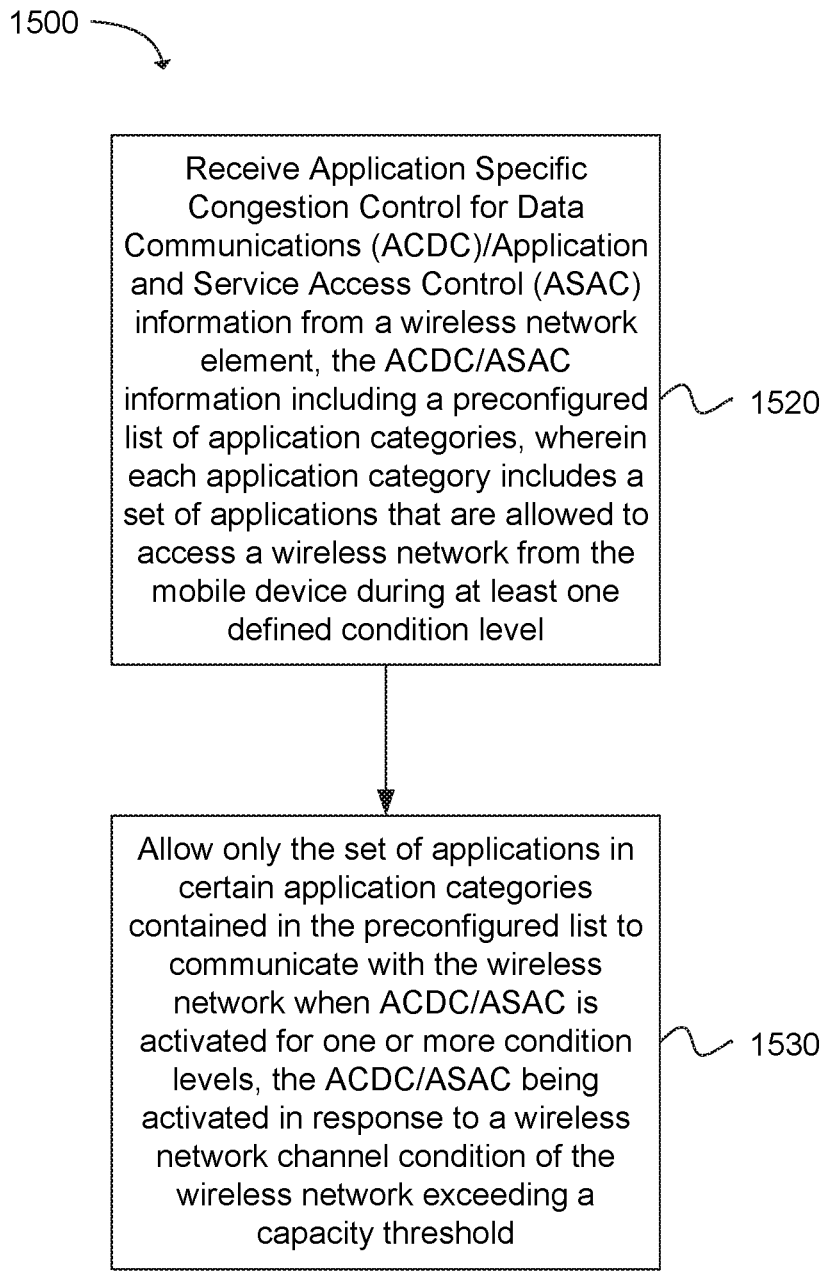
FIG. 15 depicts functionality of a user equipment (UE) operable to operate applications according to a preconfigured list of prioritized application categories in accordance with an example.

Another example provides functionality 1500 of a user equipment (UE) operable to operate applications according to a preconfigured list of prioritized application categories, as shown in the flow chart in FIG. 15. The functionality may be implemented as a method or the functionality may be executed as instructions on a machine, where the instructions are included on at least one computer readable medium or one non-transitory machine readable storage medium. The functionality can be implemented using one or more processors of the machine. The UE can be configured to receive Application Specific Congestion Control for Data Communications (ACDC)/Application and Service Access Control (ASAC) information from a wireless network element, the ACDC/ASAC information including a preconfigured list of application categories, wherein each application category includes a set of applications that are allowed to access a wireless network from the mobile device during at least one defined condition level, as in block 1510. The UE can be configured to allow only the set of applications in certain application categories contained in the preconfigured list to communicate with the wireless network when ACDC/ASAC is activated for one or more condition levels, the ACDC/ASAC being activated in response to a wireless network channel condition of the wireless network exceeding a capacity threshold, as in block 1520.

In one example, the ACDC/ASAC information received from the wireless network element includes: a probability of access and a time of barring for each of the application categories, the probability of access and the time of barring to be implemented for the application categories at the UE when the ACDC/ASAC is activated for the wireless network; or a bitmap indicating the application categories that are allowed to access the wireless network from the UE when the ACDC/ASAC is activated for the wireless network, wherein a "0" in the bitmap indicates that a particular application category is not barred and a "1" in the bitmap indicates that the particular application category is barred.

In one configuration, the ACDC/ASAC information is received upon registration of the UE or upon the UE roaming into a defined geographical region. In another configuration, the one or more processors are further configured to receive the ACDC/ASAC information from the wireless network element using an Open Mobile Alliance Device Management (OMA-DM) protocol. In one example, the UE includes an antenna, a touch sensitive display screen, a speaker, a microphone, a graphics processor, an application processor, internal memory, or a non-volatile memory port.

Figure 16:
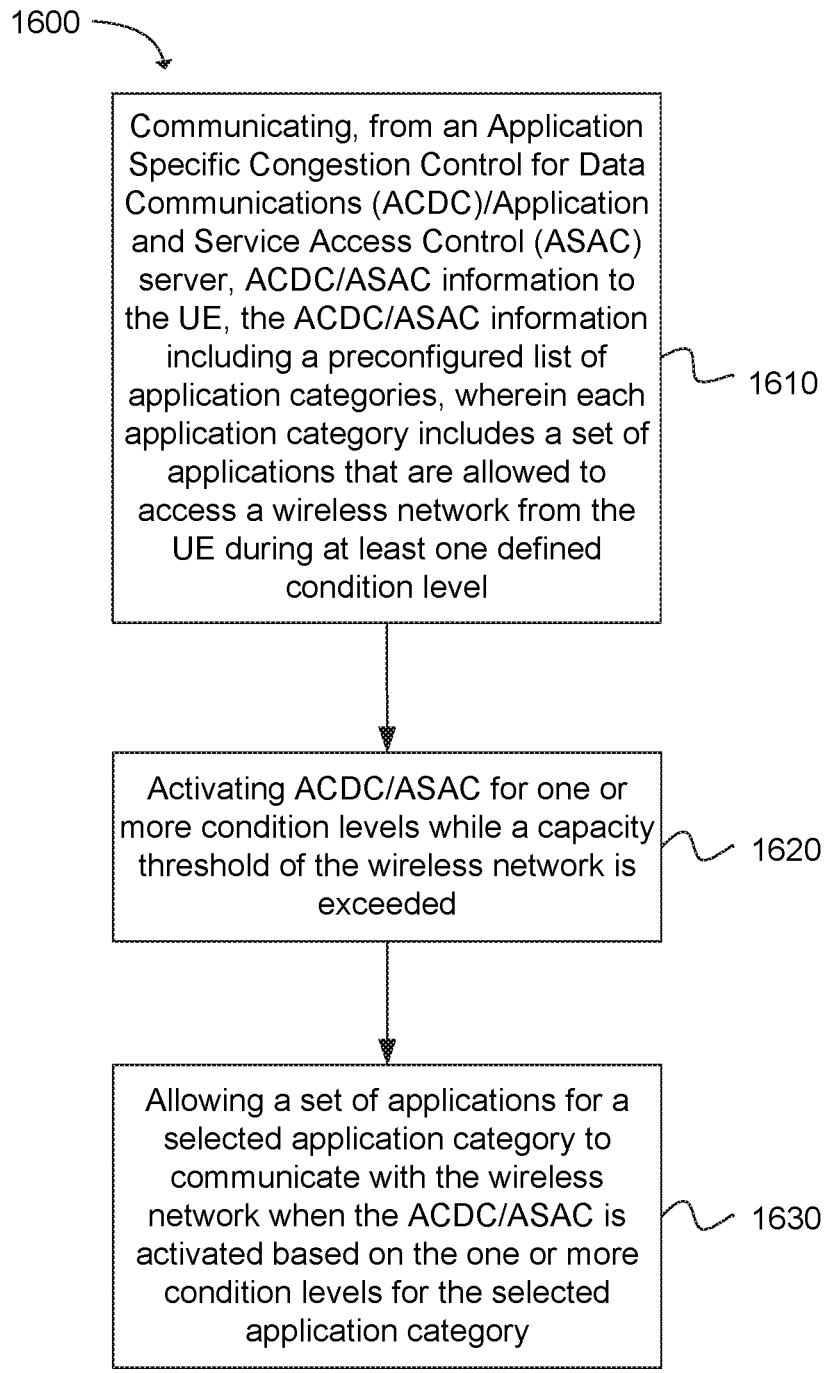
FIG. 16 depicts a flowchart of a method for provisioning categories of applications on a user equipment (UE) in accordance with an example.

Another example provides a method 1600 for provisioning categories of applications on a user equipment (UE), as shown in the flow chart in FIG. 16. The method may be executed as instructions on a machine, where the instructions are included on at least one computer readable medium or one non-transitory machine readable storage medium. The method includes the operation of communicating, from an Application Specific Congestion Control for Data Communications (ACDC)/Application and Service Access Control (ASAC) server, ACDC/ASAC information to the UE, the ACDC/ASAC information including a preconfigured list of application categories, wherein each application category includes a set of applications that are allowed to access a wireless network from the UE during at least one defined condition level, as in block 1610. The method can include the operation of activating ACDC/ASAC for one or more condition levels while a capacity threshold of the wireless network is exceeded, as in block 1620. The method an include the operation of allowing a set of applications for a selected application category to communicate with the wireless network when the ACDC/ASAC is activated based on the one or more condition levels for the selected application category, as in block 1630.

In one example, the method includes the operation of communicating the ACDC/ASAC information to the UE for a particular region in which the UE is located, the ACDC/ASAC information including the application categories that are allowed to access the wireless network for the particular region when the ACDC/ASAC is activated. In another example, the method includes the operation of communicating the ACDC/ASAC information to the UE in response to the UE registering with the wireless network or the UE roaming into a defined geographical region. In one configuration, the method includes the operation of communicating the ACDC/ASAC information to the UE via dedicated signaling or a broadcast channel. In another configuration, the method includes the operation of communicating the ACDC/ASAC information to the UE using an Open Mobile Alliance Device Management (OMA-DM) protocol.

Figure 17:
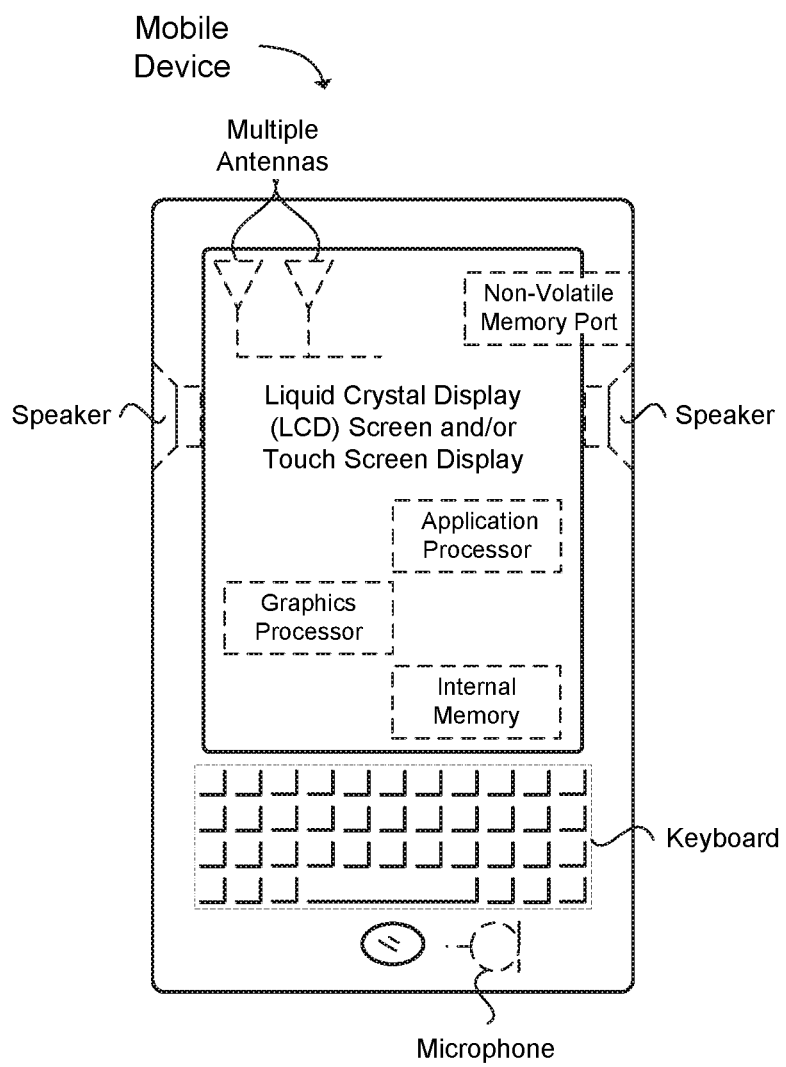
FIG. 17 illustrates a diagram of a wireless device (e.g., UE) in accordance with an example.

FIG. 17 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 17 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

As used herein, the term "processor" can include general purpose processors, specialized processors such as VLSI, FPGAs, and other types of specialized processors, as well as base band processors used in transceivers to send, receive, and process wireless communications.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus of a network element configured to apply Application Specific Congestion Control for Data Communication (ACDC) in a wireless network, the apparatus comprising:
one or more processors to:
determine, at the network element, to apply ACDC in the wireless network to mitigate overload of the wireless network; and
process, at the network element, barring information for one or more ACDC categories for transmission to a user equipment (UE) when ACDC is applied in the wireless network, wherein the barring information indicates that the UE is prevented from accessing the network for applications associated with the one or more ACDC categories when ACDC is applied in the wireless network; and
process one or more ACDC categories for transmission to the UE, wherein a highest ACDC category is associated with applications that are least likely to be restricted at the UE and a lowest ACDC category is associated with applications that are most likely to be restricted at the UE, and
memory to store the one or more ACDC categories and an indication of the applications included in the one or more ACDC categories.

2. The apparatus of claim 1, further comprising a transceiver to transmit the barring information for the one or more ACDC categories to the UE when ACDC is applied in the wireless network.

3. The apparatus of claim 1, further comprising a transceiver to broadcast the barring information for the one or more ACDC categories when ACDC is applied in the wireless network.

4. The apparatus of claim 1, wherein the one or more processors process at least four ACDC categories for transmission to the UE.

5. The apparatus of claim 1, wherein the one or more processors apply ACDC to mitigate overload in one or more of a radio access network (RAN) or a core network (CN).

6. The apparatus of claim 1, wherein the one or more processors process the barring information for the one or more ACDC categories for transmission to a roaming UE within the wireless network.

7. The apparatus of claim 1, wherein the network element is included in a Universal Terrestrial Radio Access Network (UTRAN) or an Evolved Universal Terrestrial Radio Access Network (E-UTRAN).

8. The apparatus of claim 1, wherein the applications associated with the one or more ACDC categories include operator-identified applications.

9. The apparatus of claim 1, wherein the one or more processors determine to apply ACDC in the wireless network to mitigate overload of the wireless network based on a congestion level.

10. An apparatus of a user equipment (UE) operable to control network access of applications when Application Specific Congestion Control for Data Communication (ACDC) is applied in a wireless network, the apparatus comprising:
one or more processors to:
process, at the UE, barring information for one or more ACDC categories received from a network element when ACDC is applied in the wireless network, wherein the barring information indicates to the UE that applications associated with the one or more ACDC categories are prevented at the UE from accessing the network element when ACDC is applied in the wireless network; and prevent, at the UE, the applications included in the one or more ACDC categories indicated in the barring information from accessing the network element when ACDC is applied in the wireless network; and process a configuration with one or more ACDC categories received from the network element, wherein the configuration indicates that a highest ACDC category is associated with applications that are least likely to be restricted at the UE and a lowest ACDC category is associated with applications that are most likely to be restricted at the UE; and memory to store the one or more ACDC categories and an indication of the applications included in the one or more ACDC categories.

11. The apparatus of claim 10, further comprising a transceiver to receive the barring information for the one or more ACDC categories from the network element when ACDC is applied in the wireless network.

12. The apparatus of claim 10, further comprising a transceiver to receive the barring information for the one or more ACDC categories via a broadcast from the network element.

13. The apparatus of claim 10, wherein the one or more processors process a configuration with at least four ACDC categories received from the network element.

14. The apparatus of claim 10, wherein the one or more processors process the barring information for the one or more ACDC categories received from the network element when the UE is roaming within the wireless network.

15. The apparatus of claim 10, wherein the applications associated with the one or more ACDC categories include operator-identified applications.

16. The apparatus of claim 10, wherein the UE includes an antenna, a touch sensitive display screen, a speaker, a microphone, a graphics processor, an application processor, an internal memory, or a non-volatile memory port.

17. At least one non-transitory machine readable storage medium comprising instructions embodied thereon, the instructions when executed by one or more processors of a network element cause the network element to perform the following:

determining, at the network element, to apply Application Specific Congestion Control for Data Communication (ACDC) in a wireless network to mitigate overload of the wireless network;

processing, at the network element, barring information for one or more ACDC categories for transmission to a user equipment (UE) when ACDC is applied in the wireless network, wherein the barring information indicates to the UE that applications associated with the one or more ACDC categories are prevented at the UE from accessing the network element when ACDC is applied in the wireless network; and configuring the UE with one or more ACDC categories, wherein a highest ACDC category is associated with applications that are least likely to be restricted at the UE and a lowest ACDC category is associated with applications that are most likely to be restricted at the UE.

18. The at least one non-transitory machine readable storage medium of claim 17, further comprising instructions which when executed by the one or more processors cause the network element to perform the following: processing the barring information for the one or more ACDC categories for transmission to the UE via a broadcast.

19. The at least one non-transitory machine readable storage medium of claim 17, further comprising instructions which when executed by the one or more processors cause the network element to perform the following: configuring the UE with at least four ACDC categories.

20. The at least one non-transitory machine readable storage medium of claim 17, further comprising instructions which when executed by the one or more processors cause the network element to perform the following: applying ACDC to mitigate overload in one or more of a radio access network (RAN) or a core network (CN).

21. The at least one non-transitory machine readable storage medium of claim 17, further comprising instructions which when executed by the one or more processors cause the network element to perform the following: processing the barring information for the one or more ACDC categories for transmission to a roaming UE within the wireless network.

22. The at least one non-transitory machine readable storage medium of claim 17, wherein the network element is included in a Universal Terrestrial Radio Access Network (UTRAN) or an Evolved Universal Terrestrial Radio Access Network (E-UTRAN).

23. The at least one non-transitory machine readable storage medium of claim 17, wherein the applications associated with the one or more ACDC categories include operator-identified applications.

* * * * *